United States Patent
Kojima

(10) Patent No.: US 8,509,203 B2
(45) Date of Patent: Aug. 13, 2013

(54) MOBILE STATION, WIRELESS BASE STATION, AND WIRELESS COMMUNICATION METHOD

(75) Inventor: Yuji Kojima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 118 days.

(21) Appl. No.: 13/239,829

(22) Filed: Sep. 22, 2011

(65) Prior Publication Data

US 2012/0008581 A1 Jan. 12, 2012

Related U.S. Application Data

(63) Continuation of application No. PCT/JP2009/056969, filed on Apr. 3, 2009.

(51) Int. Cl.
*H04Q 7/24* (2006.01)

(52) U.S. Cl.
USPC .......................... 370/338; 370/310

(58) Field of Classification Search
None
See application file for complete search history.

(56) References Cited

U.S. PATENT DOCUMENTS

| | | | |
|---|---|---|---|
| 2005/0049013 A1* | 3/2005 | Chang et al. | 455/574 |
| 2006/0240799 A1 | 10/2006 | Kim et al. | |
| 2008/0070642 A1* | 3/2008 | Wang et al. | 455/574 |
| 2008/0182605 A1 | 7/2008 | Yamaoka et al. | |
| 2008/0298450 A1 | 12/2008 | Zhang et al. | |
| 2009/0061893 A1 | 3/2009 | Yamamoto et al. | |
| 2009/0262675 A1* | 10/2009 | Tsai | 370/311 |
| 2009/0296617 A1* | 12/2009 | Lin et al. | 370/311 |
| 2010/0167752 A1 | 7/2010 | Kojima | |

FOREIGN PATENT DOCUMENTS

| | | |
|---|---|---|
| CA | 2 597 465 | 9/2006 |
| CA | 2 616 715 | 2/2007 |
| EP | 1 864 407 | 12/2007 |
| EP | 1 911 184 | 4/2008 |
| JP | 2006-94005 | 4/2006 |
| JP | 2008-187555 | 8/2008 |
| JP | 2008-533944 | 8/2008 |
| JP | 2008-252309 | 10/2008 |
| JP | 2009-504010 | 1/2009 |
| JP | 2009-55334 | 3/2009 |
| WO | 2006-088082 | 8/2006 |
| WO | 20061101371 | 9/2006 |
| WO | 20071015962 | 2/2007 |

OTHER PUBLICATIONS

Japanese Office Action dated Aug. 14, 2012, from corresponding Japanese Application No. 2011-506943.
Okseon Lee, et al. "Bandwidth request scheme to support multiple connection in an AMS" IEEE C802.16m-09/0596r1, IEEE 802.16 Task Group m (TGm), Mar. 3, 2009.

(Continued)

*Primary Examiner* — Duc C Ho
(74) *Attorney, Agent, or Firm* — Katten Muchin Rosenman LLP

(57) ABSTRACT

In a mobile station which communicates wirelessly with a wireless base station with a plurality of connections established by using part or all of a plurality of frequency bands, a plurality of wireless communication interfaces is associated with the plurality of frequency bands, and a processor makes a sleep request to the wireless base station, acquires from the wireless base station information about a result of scheduling complying with the sleep request and indicating non-sleep intervals of the individual connections and the frequency bands to be used for the respective non-sleep intervals, and performs sleep control on the plurality of wireless communication interfaces in accordance with the acquired information.

12 Claims, 17 Drawing Sheets

(56) References Cited

OTHER PUBLICATIONS

I-Kang Fu, et al. "Clarification on Possible Bandwidth Aggregation for Multi-carrier MS in IEEE 802.16m" IEEE C802.16m-08/562, IEEE802.16 Task Group m (TGm), Jul. 7, 2008.

Mamadou Kone, et al. "Proposed Text of Sleep Mode Operation Section for the IEEE 802.16m Amendment" IEEE C802.16m-09/0602, IEEE802.16 Task Group m (TGm), Mar. 3, 2009.

International Search Report dated May 26, 2009, from corresponding International Application No. PCT/JP2009/056969.

"IEEE Standard for Local and Metropolitan Area Networks, Part 16: Air Interface for Fixed and Mobile Broadband Wireless Access Systems, Amendment 2: Physical and Medium Access Control Layers for Combined Fixed and Mobile Operation in Licensed Bands and Corrigendum 1" IEEE Computer Society and the IEEE Microwave Theory and Techniques Society, Feb. 28, 2006.

Shkumbin Hamiti "IEEE 802.16m System Description Document [Draft]" Feb. 7, 2009.

"IEEE Std. 802.16, Part 16: Air Interface for Fixed Broadband Wireless Access Systems" IEEE Computer Society and the IEEE Microwave Theory and Techniques Society, Oct. 1, 2004.

* cited by examiner

POLICY = INTERVAL-PRIORITIZED
NUMBER OF ACTIVE CARRIERS = 2
NUMBER OF INACTIVE CARRIERS = 1

POLICY = INTERVAL-PRIORITIZED
ACTIVATE = CARRIER #1
DEACTIVATE = CARRIER #3

POLICY = INTERVAL-PRIORITIZED
T3: LISTENING INTERVAL = T3

MOBILE STATION, WIRELESS BASE STATION, AND WIRELESS COMMUNICATION METHOD

This application is a continuing application, filed under 35 U.S.C. §111(a), of International Application PCT/JP2009/056969, filed on Apr. 3, 2009.

FIELD

The embodiments discussed herein are related to a mobile station, a wireless base station, and a wireless communication method.

BACKGROUND

Currently, wireless communication systems such as mobile telephone systems and wireless LANs (Local Area Networks) are widely used. In one-to-many mobile communication systems wherein a wireless base station is able to communicate with a plurality of mobile stations, a mobile station, for example, first accesses a wireless base station to establish a connection. Then, using the connection thus established, the mobile station and the wireless base station exchange data with each other. The wireless base station has a variety of communication control functions such as the allocation of bandwidths to individual connections.

In order to save electrical power, some mobile stations have a sleep mode function (see The Institute of Electrical and Electronics Engineers (IEEE), "IEEE Standard for Local and Metropolitan Area Networks Part 16: Air Interface for Fixed and Mobile Broadband Wireless Access Systems", IEEE 802.16e-2005, 2006-02-28, for example). In the sleep mode, a sleep interval and a listening interval (non-sleep interval) are set with respect to the connection. The mobile station stops radio signal processing in the sleep interval, and restarts the radio signal processing in the listening interval. The listening interval can be set so as to occur intermittently. When entering the sleep mode, the mobile station requests a desired sleep interval to the wireless base station. Where the request of the mobile station is accepted, the wireless base station executes control so that data may not be exchanged with the mobile station during the sleep interval.

Meanwhile, in some mobile communication systems, a wireless base station and a mobile station use a plurality of frequency bands in parallel to communicate wirelessly with each other. Such a wireless communication method is often called multicarrier operation or multiband operation (see The Institute of Electrical and Electronics Engineers (IEEE), "IEEE 802.16m System Description Document [Draft]", IEEE 802.16m-08/003r7, 2009-02-07, for example). The mobile station is equipped with a plurality of wireless units for processing radio signals and thus can communicate wirelessly in parallel by using a plurality of frequency bands. The multiple frequency bands used in this case may be discontinuous.

In connection with the use of multiple frequency bands, a technique has been proposed in which, when allocating a frequency band to a mobile station, a wireless base station allocates a high-frequency band in preference over the other frequency bands (see International Publication Pamphlet No. WO 2006/088082, for example). There has also been proposed a technique in which a transmitter determines parameters to be used for the transmission process, in accordance with each user's requested QoS (Quality of Service) and the variation characteristics of individual frequency bands (see Japanese Laid-open Patent Publication No. 2006-94005, for example).

Let us consider the case where the wireless base station and the mobile station communicate wirelessly with each other by using a plurality of frequency bands. One of methods allowing the mobile station to save electric power is the aforementioned method in which the mobile station requests the wireless base station to set the sleep interval. Another method is also conceivable in which the mobile station requests the wireless base station to make one or more of the frequency bands inactive (unused). Where these two independent methods are used in combination to save electric power, however, trials and errors are liable to occur, giving rise to the problem that the overhead of communication control increases.

Specifically, the designation of a sleep interval by the mobile station can possibly be rejected by the wireless base station, and such a situation occurs when the bandwidth for the listening interval fails to be secured, for example. In such cases, if the frequency band or bands to be activated (to be used) are changed, the designation of the sleep interval can possibly be permitted. Thus, the mobile station has to designate the frequency bands to be activated or deactivated as well as the sleep intervals of individual connections one after another in order to select a desirable power saving method from among the settable combinations, entailing trials and errors.

SUMMARY

According to one aspect of the present invention, there is provided a mobile station for communicating wirelessly with a wireless base station with a plurality of connections established by using part or all of a plurality of frequency bands. The mobile station includes a plurality of wireless communication interfaces associated with the plurality of frequency bands, and a processor configured to make a sleep request to the wireless base station, acquire from the wireless base station information about a result of scheduling complying with the sleep request and indicating non-sleep intervals of the individual connections and the frequency bands to be used for the respective non-sleep intervals, and perform sleep control on the plurality of wireless communication interfaces in accordance with the acquired information.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
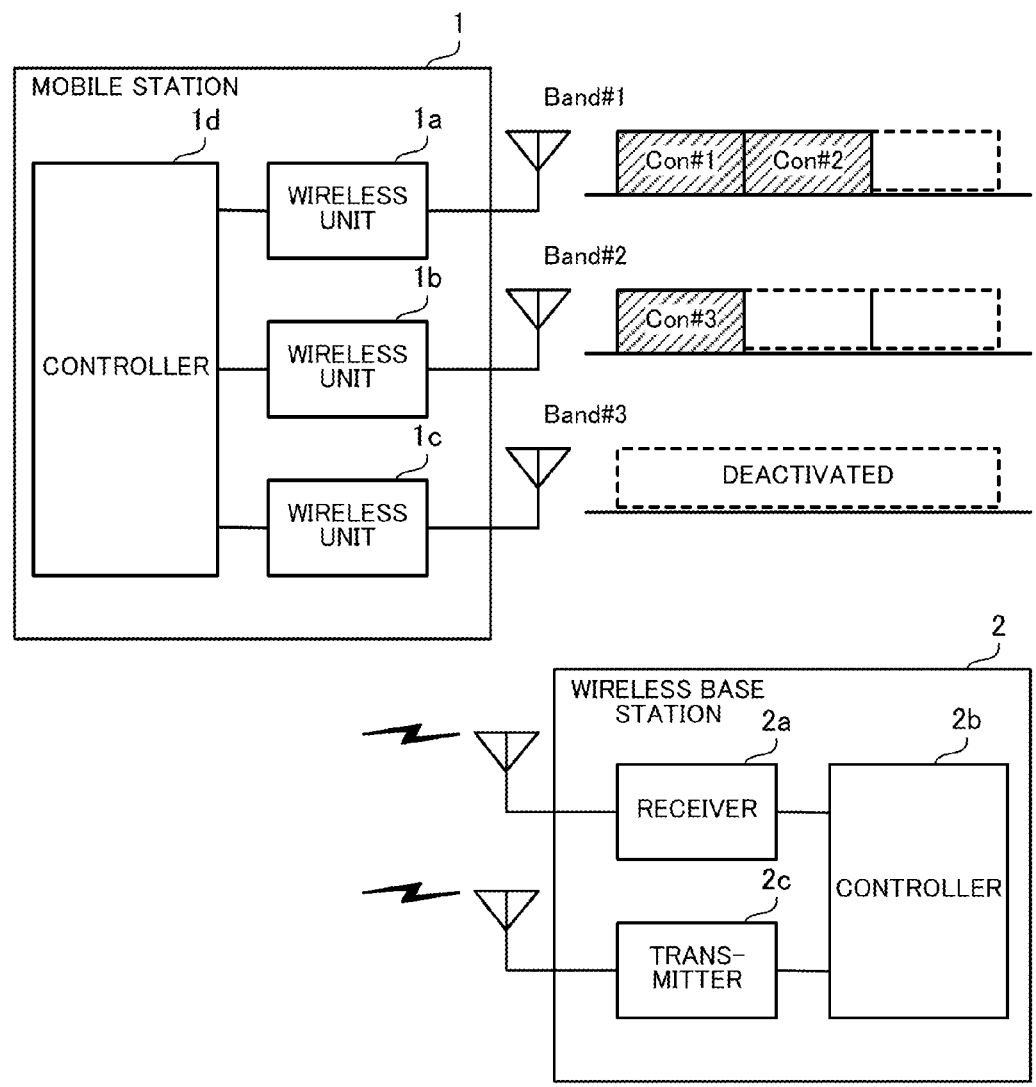
FIG. 1 exemplifies a mobile station and a wireless base station according to an embodiment.

Embodiments of the present invention will be described in detail below with reference to the accompanying drawings, wherein like reference numerals refer to like elements throughout.

FIG. 1 exemplifies a mobile station and a wireless base station according to an embodiment. The mobile station 1 and the wireless base station 2 can communicate wirelessly with each other by using a plurality of frequency bands (e.g., three frequency bands #1, #2 and #3) in parallel. Also, a plurality of connections (e.g., three connections #1, #2 and #3) can be established between the mobile station 1 and the wireless base station 2.

The mobile station 1 includes wireless units 1a, 1b and 1c, and a controller 1d.

Each of the wireless units 1a, 1b and 1c performs radio signal processing. The radio signal processing includes a transmission process (modulation and encoding) and reception process (demodulation and decoding) at the Physical layer, for example, but may include only one of the transmission and reception processes. The wireless unit 1a is associated with the frequency band #1, the wireless unit 1b is associated with the frequency band #2, and the wireless unit 1c is associated with the frequency band #3. The wireless units 1a, 1b and 1c can stop their radio signal processing independently of one another.

The controller 1d performs stop control on the wireless units 1a, 1b and 1c so that the wireless units 1a, 1b and 1c may individually stop transmitting and receiving radio signals. Specifically, a wireless unit which is associated with an inactive frequency band, among the wireless units 1a, 1b and 1c, is stopped so as not to transmit or receive radio signals. Preferably, such a wireless unit is supplied with low electric power, compared with that supplied while the wireless units 1a, 1b and 1c are not stopped, thereby setting the wireless unit in standby mode, or is supplied with no electric power at all, thereby switching off the wireless unit. Also, the controller 1d intermittently stops the wireless units associated with active frequency bands, so as to coincide with sleep intervals of the respective connections #1, #2 and #3. For example, the wireless units are stopped only for an interval during which the sleep intervals of all connections #1, #2 and #3 overlap.

Where the entry into sleep mode after the establishment of a connection is desired, the controller 1d makes a sleep request to the wireless base station 2. The sleep request may be transmitted using a desired one or more of the wireless units 1a, 1b and 1c. Then, in accordance with information transmitted from the wireless base station 2 in compliance with the sleep request, the controller 1d determines the states of the frequency bands #1, #2 and #3 and the sleep intervals of the connections #1, #2 and #3, and performs the stop control on the wireless units 1a, 1b and 1c.

The wireless base station 2 includes a receiver 2a, a controller 2b, and a transmitter 2c.

The receiver 2a receives the sleep request from the mobile station 1. In compliance with the received sleep request, the controller 2b schedules non-sleep intervals (i.e., listening intervals) of the respective connections #1, #2 and #3 and the frequency bands to be used for the respective listening intervals. The scheduling is carried out taking account of, for example, available bandwidths of the individual frequency bands at respective timings and the bandwidth to be secured for the listening intervals. The transmitter 2c transmits information about the result of the scheduling by the controller 2b to the mobile station 1.

Various conditions can be designated by means of the sleep request transmitted from the mobile station 1 to the wireless base station 2. A scheduling policy, for example, may be designated. Conceivably, the scheduling policy may be: "as many frequency bands as possible are to be deactivated", "the sleep interval common to all connections is to be prolonged as far as possible even at the sacrifice of the number of active frequency bands", or the like. It is also possible to designate, as scheduling conditions, the frequency band or bands to be activated or deactivated, the number of the frequency bands to be activated or deactivated, and intervals to be set as the listening intervals.

The information transmitted from the wireless base station 2 to the mobile station 1 may include, for example, a frequency band or bands whose state is to be changed from the active state to the inactive state, a frequency band or bands whose state is to be changed from the inactive state to the active state, and the sleep interval of one or more or all of the connections. The scheduling result itself, namely, the listening intervals of the respective connections and their allocated frequency bands, may of course be communicated to the mobile station 1.

Let it be assumed, for example, that among timeslots T1, T2 and T3, the listening interval of the connection #1 is allocated to the timeslot T1 of the frequency band #1, that the listening interval of the connection #2 is allocated to the timeslot T2 of the frequency band #1, and that the listening interval of the connection #3 is allocated to the timeslot T1 of the frequency band #2. In this case, nothing is allocated to the frequency band #3 of the mobile station 1, and thus the frequency band #3 can be deactivated. That is, the wireless unit 1c can be stopped throughout the timeslots T1, T2 and T3. Also, the timeslot T3 is a sleep interval common to all connections, and therefore, the wireless units 1a and 1b can also be stopped during the timeslot T3.

Thus, with the mobile station 1 and the wireless base station 2 configured in this manner, the mobile station 1 transmits a sleep request to the wireless base station 2. In compliance with the sleep request, the wireless base station 2 schedules the listening intervals of the respective connections #1, #2 and #3 and the frequency bands to be used for the respective listening intervals, and transmits information about the scheduling result to the mobile station 1. In accordance with the information received from the wireless base station 2, the mobile station 1 performs the stop control on the wireless units 1a, 1b and 1c.

Consequently, power saving control of the mobile station 1 can be efficiently executed. That is, the mobile station 1 need not try each of the combinations of the states of the frequency bands #1, #2 and #3 and the sleep intervals of the connections #1, #2 and #3 one after another. Since settable combinations are calculated by the wireless base station 2, the mobile station 1 can promptly execute the stop control in accordance with the information received from the wireless base station 2.

The following describes an exemplary mobile communication system in which the aforementioned power saving control method is carried out in a more detained fashion.

[a] First Embodiment

Figure 2:
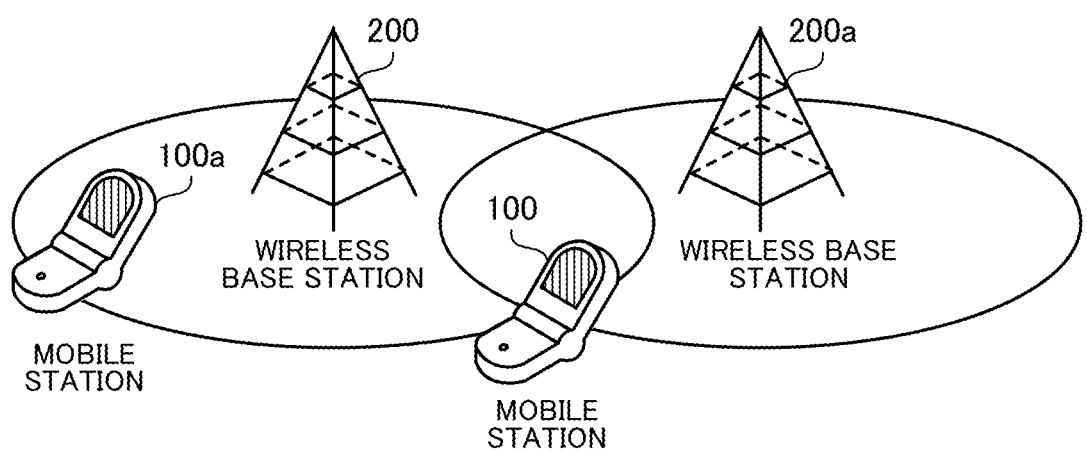
FIG. 2 illustrates an entire configuration of a mobile communication system.

FIG. 2 illustrates an entire configuration of the mobile communication system. The mobile communication system of a first embodiment includes mobile stations 100 and 100a, and wireless stations 200 and 200a.

The mobile stations 100 and 100a are each a mobile communication device capable of wireless communication. Conceivably, each of the mobile stations 100 and 100a may be a mobile telephone or a portable information terminal device with wireless communication function, for example. The mobile stations 100 and 100a individually access the wireless base stations 200 and 200a to exchange data therewith. The wireless base stations 200 and 200a are each a communication device capable of communicating wirelessly with mobile stations existing within the respective cells. The wireless base stations 200 and 200a are coupled to a wired network, not illustrated in FIG. 2.

The mobile stations 100 and 100a and the wireless base stations 200 and 200a can communicate wirelessly with each other by using a plurality of carriers (three carriers #1, #2 and #3) of respective different frequency bands. The multiple frequency bands may be either continuous or discontinuous. Also, all carriers may be activated (active state) or one or more of the carriers may be deactivated (inactive state). The states of the carriers can be set with respect to each mobile station.

Further, a plurality of connections can be established between the mobile stations 100 and 100a and the wireless base stations 200 and 200a. In the following description, it is assumed that the three connections #1, #2 and #3 are established between the mobile station 100 and the wireless base station 200. The mobile station 100 can also establish connections with both of the wireless base stations 200 and 200a. Conceivably, in this case, the wireless base stations 200 and 200a communicate with each other to cooperatively perform connection control.

The mobile communication system of this embodiment can be implemented as a WiMAX (Worldwide Interoperability for Microwave Access) communication system. The mobile communication system is capable of multicarrier operation, as stated above. Multicarrier operation is advantageous in that the data communication speed can be increased by widening the available total bandwidth and also in that a plurality of discontinuous frequency bands can be used.

Figure 3:
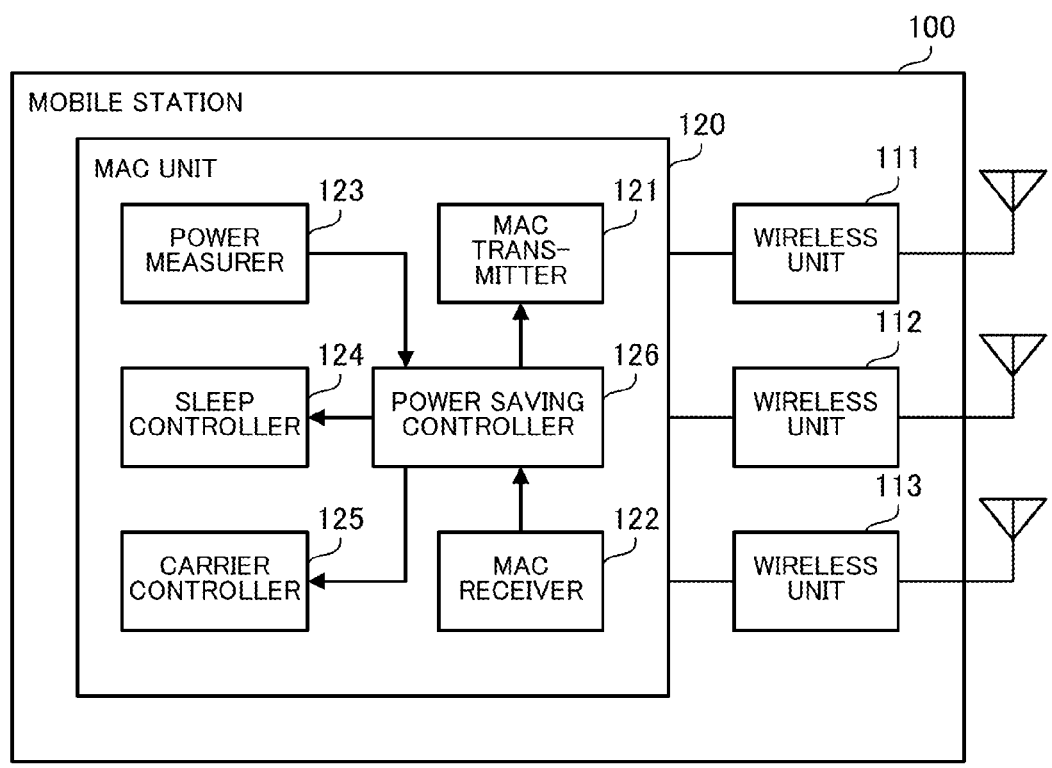
FIG. 3 is a block diagram of the mobile station.

FIG. 3 is a block diagram of the mobile station. The mobile station 100 includes wireless units 111, 112 and 113, and a MAC (Media Access Control) unit 120. The MAC unit 120 includes a MAC transmitter 121, a MAC receiver 122, a power measurer 123, a sleep controller 124, a carrier controller 125, and a power saving controller 126. The mobile station 100a may be configured in the same manner as the mobile station 100.

The wireless units 111, 112 and 113 perform radio signal processing at the Physical layer in parallel with one another. The wireless unit 111 is associated with the carrier #1, the wireless unit 112 is associated with the carrier #2, and the wireless unit 113 is associated with the carrier #3. The processing executed by the wireless units 111, 112 and 113 includes a transmission process such as encoding, modulation and DA (Digital-to-Analog) conversion, and a reception process such as AD (Analog-to-Digital) conversion, demodulation and decoding. The wireless units 111, 112 and 113 process MAC packets acquired from the MAC unit 120, and output the processed MAC packets wirelessly. Also, the wireless units 111, 112 and 113 output, to the MAC unit 120, the MAC packets obtained by the reception process. The wireless units 111, 112 and 113 are capable of stopping their processes independently of one another.

The MAC transmitter 121 performs transmission processing at the MAC layer, such as the addition of a MAC header, on user data and control information. For example, the MAC transmitter 121 processes the control information acquired from the power saving controller 126, and outputs the MAC packets obtained to a wireless unit associated with an active carrier. The process of the MAC transmitter 121 may be stopped while all of the wireless units 111, 112 and 113 are stopped.

The MAC receiver 122 performs reception processing at the MAC layer, such as the removal of the MAC header, on the MAC packets acquired from the wireless units 111, 112 and 113, to extract user data and control information. Then, the MAC receiver 122 outputs a predetermined kind of extracted control information to the power saving controller 126. The process of the MAC receiver 122 may also be stopped while all of the wireless units 111, 112 and 113 are stopped.

In accordance with instructions from the power saving controller 126, the power measurer 123 measures the electric power consumed by all elements or certain elements (e.g., the wireless units 111, 112 and 113 and the MAC unit 120) of the mobile station 100. The power measurer 123 outputs the measurement result to the power saving controller 126.

The sleep controller 124 executes sleep mode-related control in accordance with instructions from the power saving controller 126. Specifically, the sleep controller 124 acquires information about the sleep intervals of the individual connections from the power saving controller 126, and causes all wireless units, the MAC transmitter 121 and the MAC receiver 122 to stop during an interval (unavailable interval) in which all connections sleep. Also, during an interval in which any one of the connections is in the listening interval, the sleep controller 124 activates the wireless unit associated with the active carrier, the MAC transmitter 121, and the MAC receiver 122.

A circuit for executing the sleep control may be provided externally to the MAC unit 120. In this case, the MAC unit 120 may be stopped in its entirety during the unavailable interval.

The carrier controller 125 controls the states of the carriers #1, #2 and #3 in accordance with instructions from the power saving controller 126. Specifically, when a notification to change carrier states is received from the power saving controller 126, the carrier controller 125 activates the wireless unit(s) associated with the carrier(s) to be activated, and stops the wireless unit(s) associated with the carrier(s) to be deactivated.

The power saving controller 126 exchanges control information with the wireless base station 200 and performs stop control on the wireless units 111, 112 and 113, the MAC transmitter 121, and the MAC receiver 122. Specifically, the power saving controller 126 generates control information on the request for the sleep mode and outputs the generated control information to the MAC transmitter 121. Also, the power saving controller 126 acquires, from the MAC receiver 122, control information about changes of the carrier states and the settings of the sleep intervals, and instructs the sleep controller 124 and the carrier controller 125 to operate in accordance with the acquired control information. Further, the power saving controller 126 acquires the power consumption measurement result from the power measurer 123 and determines a method for the stop control whereby the power consumption can be minimized.

Figure 4:
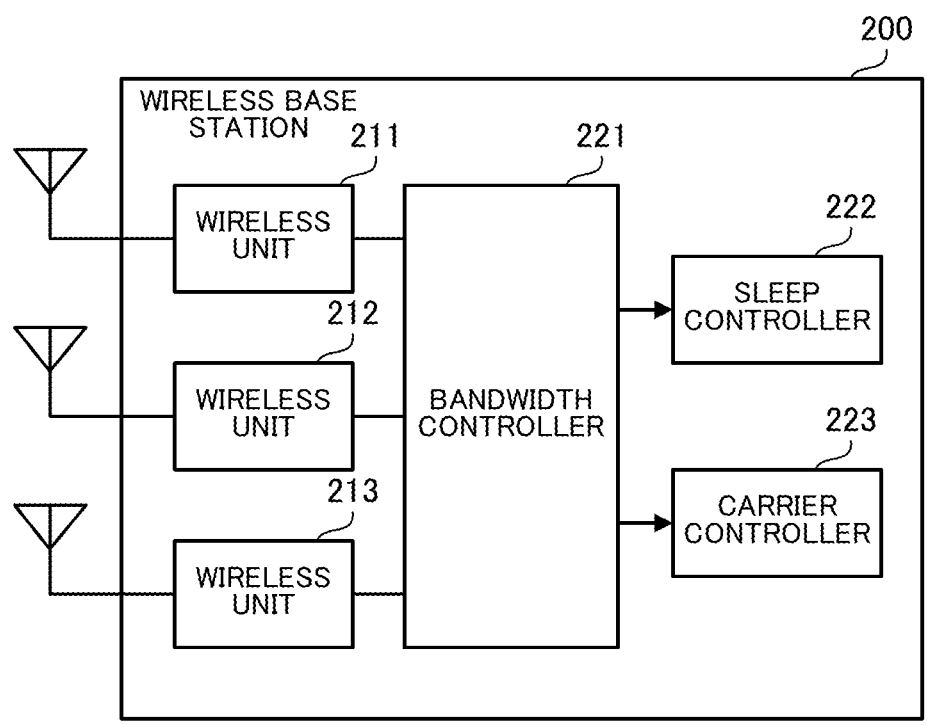
FIG. 4 is a block diagram of the wireless base station.

FIG. 4 is a block diagram of the wireless base station. The wireless base station 200 includes wireless units 211, 212 and 213, a bandwidth controller 221, a sleep controller 222, and a carrier controller 223. The wireless base station 200a may also be configured in the same manner as the wireless base station 200.

The wireless units 211, 212 and 213 carry out radio signal processing at the Physical layer in parallel with one another. The wireless unit 211 is associated with the carrier #1, the wireless unit 212 is associated with the carrier #2, and the wireless unit 213 is associated with the carrier #3. The wireless units 211, 212 and 213 process control information acquired from the bandwidth controller 221, and output the processed control information wirelessly. Also, the wireless units 211, 212 and 213 output, to the bandwidth controller 221, the control information obtained by the reception process. Where the carriers #1, #2 and #3 use a single continuous frequency band, however, the above process may be executed by a single wireless unit.

The bandwidth controller 221 optimizes the carrier states and the sleep intervals. Specifically, when the control information including the request for the sleep mode is received from the wireless unit 211, 212 or 213, the bandwidth controller 221 schedules the bandwidth for the listening intervals, taking account of demanded bandwidths of the individual connections and bandwidth availability status of the carriers #1, #2 and #3. Then, the bandwidth controller 221 notifies the sleep controller 222 of the sleep intervals determined as a result of the scheduling, and notifies the carrier controller 223 of the determined carrier states. Also, the bandwidth controller 221 outputs control information about the carrier states and the sleep intervals to a wireless unit associated with an active carrier.

The sleep controller 222 executes communication control matching the set sleep intervals in accordance with instructions from the bandwidth controller 221. Specifically, the sleep controller 222 acquires information about the sleep intervals of the individual connections from the bandwidth controller 221 and controls the communication so that during the interval (unavailable interval) in which all connections sleep, no bandwidth may be used for the mobile station 100.

The carrier controller 223 executes communication control matching the set carrier states in accordance with instructions from the bandwidth controller 221. Specifically, the carrier controller 223 acquires information about the carrier states from the bandwidth controller 221 and controls the communication so that the bandwidth of an inactive carrier may not be used for the mobile station 100.

Figure 5:
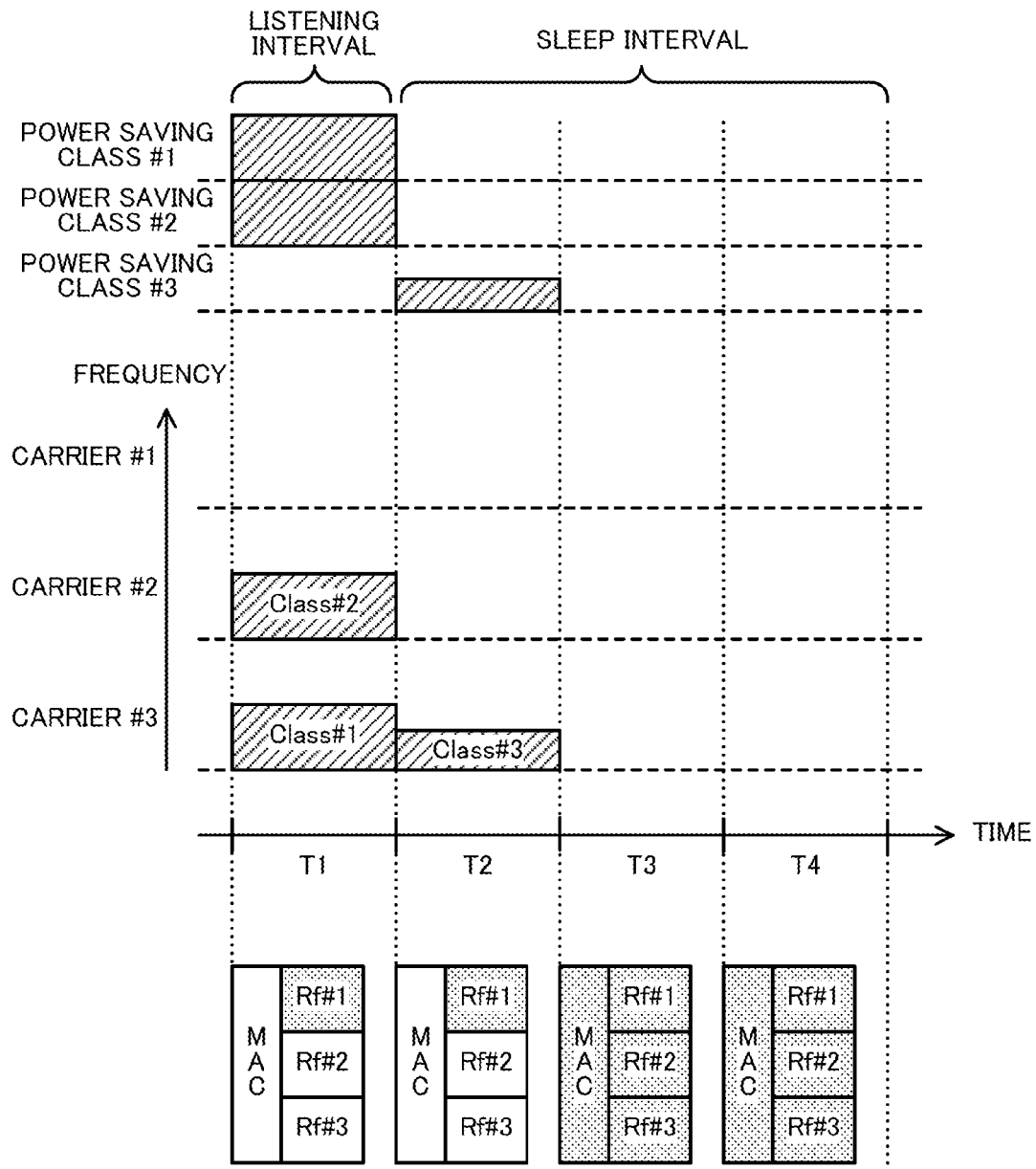
FIG. 5 illustrates relations between listening intervals and carrier states.

FIG. 5 illustrates relations between the listening intervals and the carrier states. In power saving control, power saving class (PSC) is used as a unit of control. One power saving class includes one or more connections, and various parameters such as the sleep interval and the listening interval are set with respect to the power saving class. The power saving classes are created by the wireless base station 200 in compliance with the request from the mobile station 100. The following description is based on the assumption that the connections #1, #2 and #3 respectively belong to the power saving classes #1, #2 and #3.

The listening and sleep intervals of the individual power saving classes #1, #2 and #3 are defined with respect to a predetermined time unit. Namely, as the time unit repeats itself, the listening and sleep intervals recurrently appear. The time unit includes a plurality of timeslots, and the timeslot has a length equal to that of a radio frame, for example. In the example illustrated in FIG. 5, the predetermined time unit includes timeslots T1 to T4.

The bandwidth allocated for the listening interval of each power saving class is specified by: carrier×timeslot. In the example of FIG. 5, the bandwidth of the timeslot T1 of the carrier #3 is allocated for the power saving class #1, the bandwidth of the timeslot T1 of the carrier #2 is allocated for the power saving class #2, and the bandwidth of the timeslot T2 of the carrier #3 is allocated for the power saving class #3. The bandwidth demanded by each power saving class equals, for example, the sum of demanded bandwidths of the connections belonging to that power saving class.

A method for the power saving control of the mobile station 100 is determined in accordance with the result of the bandwidth allocation by the wireless base station 200. In the case of the above allocation result, the carrier #1 can be deactivated, so that the radio signal processing of the carrier #1 can be stopped throughout all timeslots. Also, the timeslots T3 and T4 are a sleep interval (unavailable interval) common to all power saving classes, and thus, the radio signal processing of all carriers and the MAC processing can be stopped during the timeslots T3 and T4.

As a power saving policy, the following two are conceivable: one is a policy of allocating the bandwidth so that as many carriers as possible may be deactivated; and the other is a policy of allocating the bandwidth so that as many timeslots as possible may constitute the unavailable interval. In the following, the former will be referred to as carrier-prioritized policy and the latter as interval-prioritized policy. The number of carriers that can be deactivated and the number of timeslots that can be made to constitute the unavailable interval are also dependent on the status of bandwidth allocation to other mobile stations (e.g., the mobile station 100a). Further, which method can more effectively reduce the power consumption by the mobile station 100 depends upon other conditions.

In this embodiment, the mobile station 100 does not stop the radio signal processing of the carrier #2 during the timeslot T2. The reason is that the wireless base station 200 does not notify the mobile station 100 of the bandwidth allocation result itself. In this case, the wireless base station 200 is allowed to flexibly allocate a carrier, from among active carriers, to the connection belonging to the power saving class #3 each time a radio frame is transmitted. If the mobile station 100 is informed in advance that the bandwidth of the carrier #3 is allocated to the power saving class #3, however, the mobile station 100 can stop the radio signal processing of the carrier #2.

Figure 6:
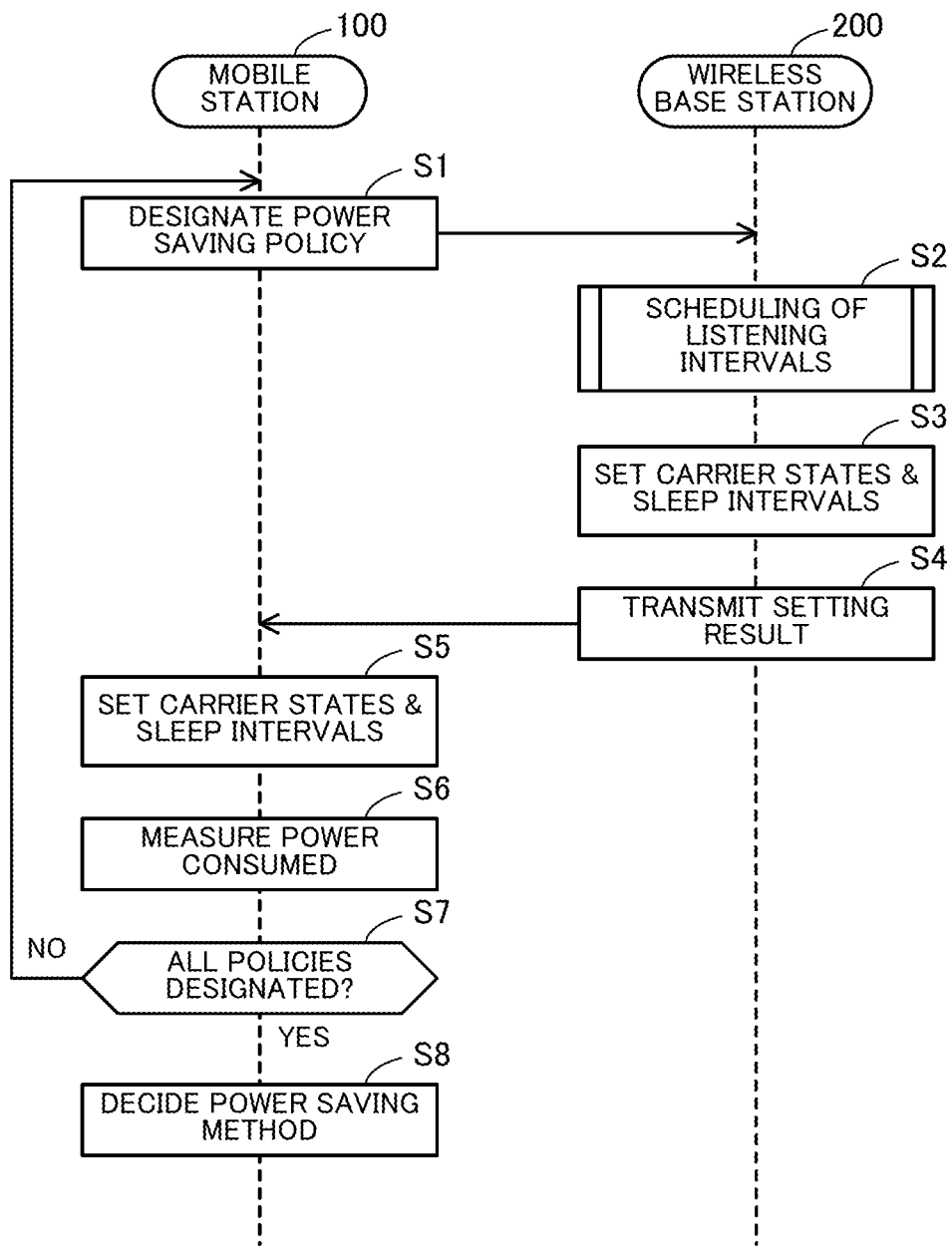
FIG. 6 is a flowchart illustrating a sleep control procedure.

FIG. 6 is a flowchart illustrating a sleep control procedure. In the following, the process illustrated in FIG. 6 will be explained in order of step number.

Step S1: The power saving controller 126 of the mobile station 100 selects one policy from among the multiple power saving policies (e.g., the carrier-prioritized policy and the interval-prioritized policy). The mobile station 100 then transmits control information designating the selected power saving policy to the wireless base station 200.

Step S2: The bandwidth controller 221 of the wireless base station 200 confirms the power saving policy designated by the control information acquired from the mobile station 100. Then, following the designated power saving policy, the bandwidth controller 221 schedules the bandwidth to be secured for the listening intervals. As a result of the scheduling, a maximum number of carriers that can be deactivated or a maximum timeslot length that can be set as the unavailable interval is specified within the settable range.

Step S3: In accordance with the scheduling result obtained in Step S2, the bandwidth controller 221 of the wireless base station 200 sets the respective states of the carriers #1, #2 and #3. Also, the bandwidth controller 221 sets the respective sleep intervals of the power saving classes #1, #2 and #3.

Step S4: The bandwidth controller 221 of the wireless base station 200 transmits control information about the setting result, obtained in Step S3, to the mobile station 100. The control information includes at least one of information about the carriers to be activated, information about the carriers to be deactivated, and information about change of parameters of the power saving classes.

Step S5: The power saving controller 126 of the mobile station 100 sets the carrier states and the sleep intervals in accordance with the control information acquired from the wireless base station 200. Specifically, the power waving controller 126 designates the sleep intervals with respect to the sleep controller 124 and designates the carrier states with respect to the carrier controller 125, whereby the radio signal processing and the MAC processing are stopped in part or in their entirety. Changes of the carrier states and of the sleep intervals may be reflected after a lapse of a predetermined time from the reception of the control information.

Step S6: The power saving controller 126 of the mobile station 100 instructs the power measurer 123 to measure the consumed power. The power measurer 123 measures the electric power consumed by the mobile station 100 over a predetermined time (e.g., the unit time with respect to which the listening and sleep intervals of the power saving classes are defined), and reports the measurement result (e.g., average power consumed) to the power saving controller 126.

Step S7: The power saving controller 126 of the mobile station 100 determines whether all of the power saving policies have been selected in Step S1 or not. If all power saving policies have been selected, the process proceeds to Step S8; if there remains an unselected power saving policy, the process proceeds to Step S1.

Step S8: The power saving controller 126 of the mobile station 100 compares the consumed powers of the respective power saving policies with each other and identifies the power saving policy in accordance with which the power consumption is minimized. Then, the power saving controller 126 adopts a stop control method (combination of the individual carrier states and the sleep intervals of the respective power saving classes) corresponding to the identified power saving policy.

In this manner, the mobile station 100 designates a scheduling policy (power saving policy) with respect to the wireless base station 200. Following the policy designated by the mobile station 100, the wireless base station 200 schedules the bandwidth to be secured for the listening intervals. The wireless base station 200 then provides the mobile station 100 with information derived from the scheduling result, namely, information about the carriers that can be deactivated and the intervals that can be set as the sleep intervals. The mobile station 100 executes stop control in accordance with the notification from the wireless base station 200 and measures the electric power consumed.

Figure 7:
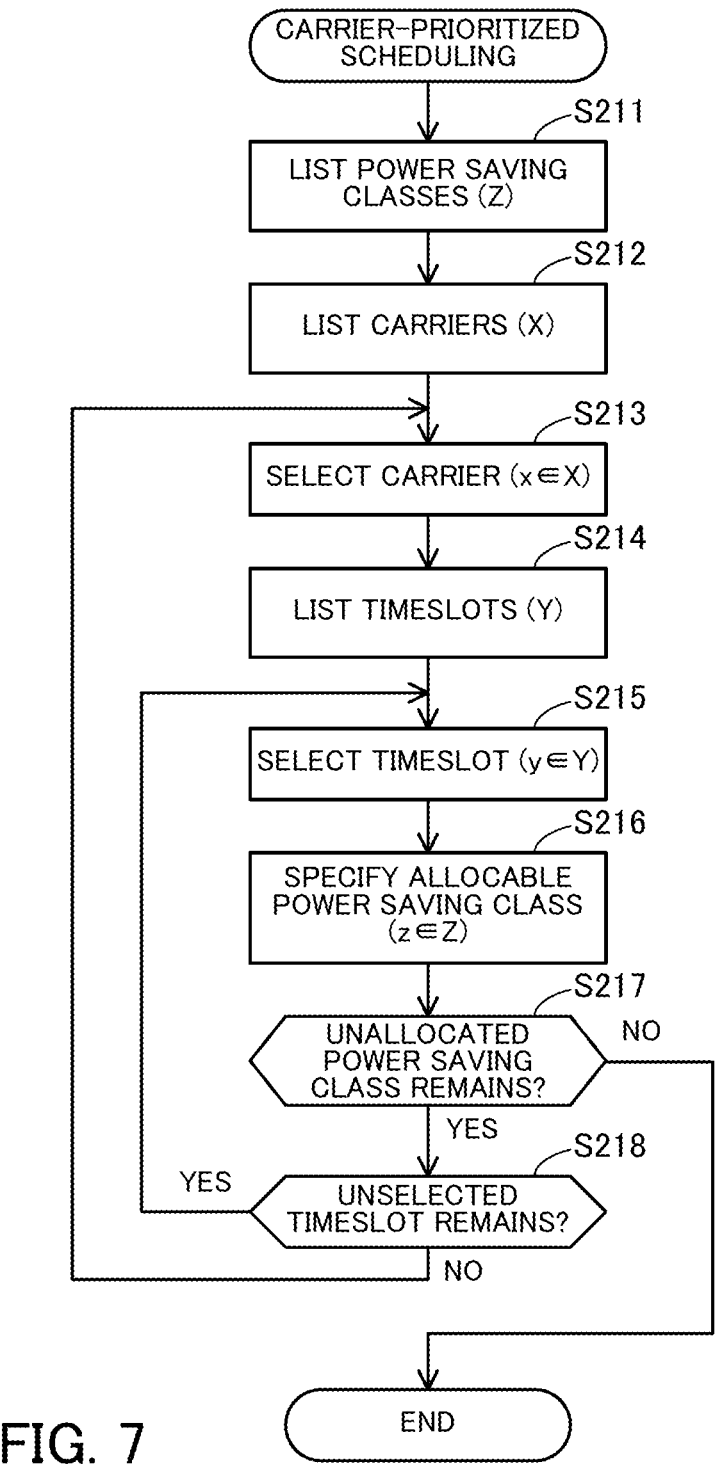
FIG. 7 is a flowchart illustrating a carrier-prioritized scheduling procedure.

FIG. 7 is a flowchart illustrating a carrier-prioritized scheduling procedure. This process is executed in the aforementioned Step S2 by the wireless base station 200 when the carrier-prioritized policy has been designated. In the following, the process illustrated in FIG. 7 will be explained in order of step number.

Step S211: The bandwidth controller 221 makes a list of the power saving classes #1, #2 and #3 arranged in descending order of demanded bandwidth. The power saving class list will be denoted herein by Z.

Step S212: The bandwidth controller 221 makes a list of the carriers #1, #2 and #3 arranged in descending order of available bandwidth. The carrier list will be denoted herein by X. If there are a plurality of carriers having the same size of available bandwidth, a currently active carrier is ranked above a currently inactive carrier.

Step S213: The bandwidth controller 221 selects a carrier (carrier x) which ranks at the top (largest in available bandwidth) of the list X obtained in Step S212.

Step S214: With respect to the carrier x selected in Step S213, the bandwidth controller 221 makes a list of the timeslots T1 to T4 arranged in descending order of available bandwidth. The timeslot list will be denoted herein by Y. If there are a plurality of timeslots having the same size of available bandwidth, a timeslot which is adjacent in time to the timeslot listed immediately above is ranked above the other timeslots.

Step S215: The bandwidth controller 221 selects a timeslot (timeslot y) which ranks at the top (largest in available bandwidth) of the list Y obtained in Step S214.

Step S216: The bandwidth controller 221 extracts a power saving class z that can be allocated to the timeslot y of the carrier x, from the list Z obtained in Step S211. In this case, a power saving class nearer to the top of the list Z (larger in demanded bandwidth) is preferentially extracted. That is, the list Z is successively searched, from the top thereof, for a power saving class whose demanded bandwidth is less than or equal to the available bandwidth of the timeslot y of the carrier x. If the total demanded bandwidth is less than the available bandwidth, a plurality of power saving classes may be allocated.

Step S217: The bandwidth controller 221 determines whether or not an unallocated power saving class remains in the list Z. If there remains an unallocated power saving class, the process proceeds to Step S218; if there remains no unallocated power saving class, the scheduling is ended, whereupon the aforementioned Step S3 is executed.

Step S218: The bandwidth controller 221 determines whether or not an unselected timeslot remains in the list Y. If there remains an unselected timeslot, the process proceeds to Step S215; if there remains no unselected timeslot, the process proceeds to Step S213.

In this manner, the wireless base station 200 allocates the bandwidth for the listening interval while giving priority to carriers with large available bandwidth. This serves to minimize the number of active carriers. That is, the number of inactive carriers can be maximized. It is to be noted that the algorithm described above is exemplary only, and the carrier-prioritized policy can be implemented by using other algorithms than the aforementioned one.

Figure 8:
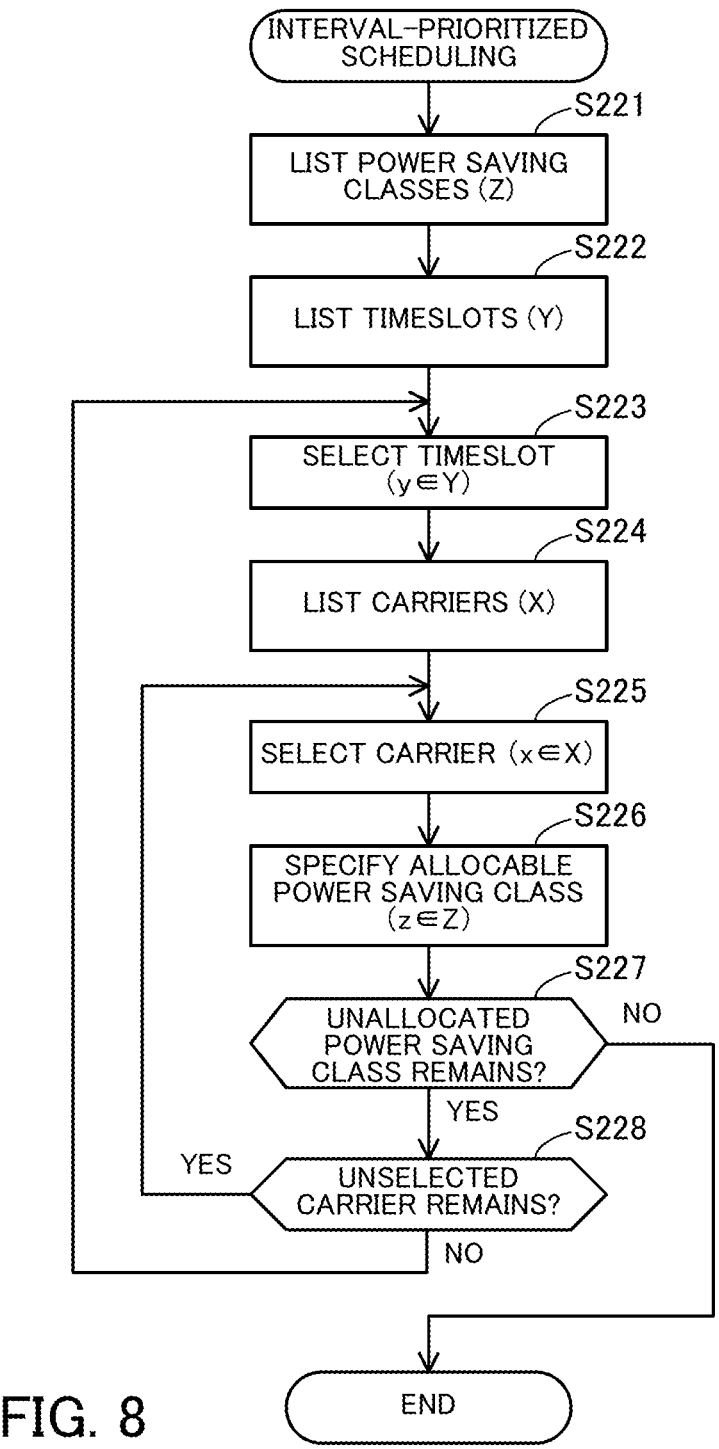
FIG. 8 is a flowchart illustrating an interval-prioritized scheduling procedure.

FIG. 8 is a flowchart illustrating an interval-prioritized scheduling procedure. This process is executed in the aforementioned Step S2 by the wireless base station 200 when the interval-prioritized policy has been designated. In the following, the process illustrated in FIG. 8 will be explained in order of step number.

Step S221: The bandwidth controller 221 makes a list of the power saving classes #1, #2 and #3 arranged in descending order of demanded bandwidth. The power saving class list will be denoted herein by Z.

Step S222: The bandwidth controller 221 makes a list of the timeslots T1 to T4 across the carriers, arranged in descending order of available bandwidth. The timeslot list will be denoted herein by Y. If there are a plurality of timeslots having the same size of available bandwidth, a timeslot which is adjacent in time to the timeslot listed immediately above is ranked above the other timeslots.

Step S223: The bandwidth controller 221 selects a timeslot (timeslot y) which ranks at the top (largest in available bandwidth) of the list Y obtained in Step S222.

Step S224: With respect to the timeslot y selected in Step S223, the bandwidth controller 221 makes a list of the carriers #1, #2 and #3 arranged in descending order of available bandwidth. The carrier list will be denoted herein by X. If there are a plurality of carriers having the same size of available bandwidth, a currently active carrier is ranked above a currently inactive carrier.

Step S225: The bandwidth controller 221 selects a carrier (carrier x) which ranks at the top (largest in available bandwidth) of the list X obtained in Step S224.

Step S226: The bandwidth controller 221 extracts a power saving class z that can be allocated to the timeslot y of the carrier x, from the list Z obtained in Step S221. In this case, a power saving class nearer to the top of the list Z (larger in demanded bandwidth) is preferentially extracted. If the total demanded bandwidth is less than the available bandwidth, a plurality of power saving classes may be allocated.

Step S227: The bandwidth controller 221 determines whether or not an unallocated power saving class remains in the list Z. If there remains an unallocated power saving class, the process proceeds to Step S228; if there remains no unallocated power saving class, the scheduling is ended, whereupon the aforementioned Step S3 is executed.

Step S228: The bandwidth controller 221 determines whether or not a carrier not yet selected in Step S225 remains in the list X. If there remains an unselected carrier, the process proceeds to Step S225; if there remains no unselected carrier, the process proceeds to Step S223.

In this manner, the wireless base station 200 allocates the bandwidth for the listening interval while giving priority to those timeslots which have large available bandwidth across the carriers. This serves to concentrate the listening intervals in the shortest possible interval. That is, the unavailable interval where the sleep intervals of all power saving classes overlap can be prolonged as far as possible. It is to be noted, however, that the algorithm described above is exemplary only, and the interval-prioritized policy can be implemented by using other algorithms than the aforementioned one.

Figure 9:
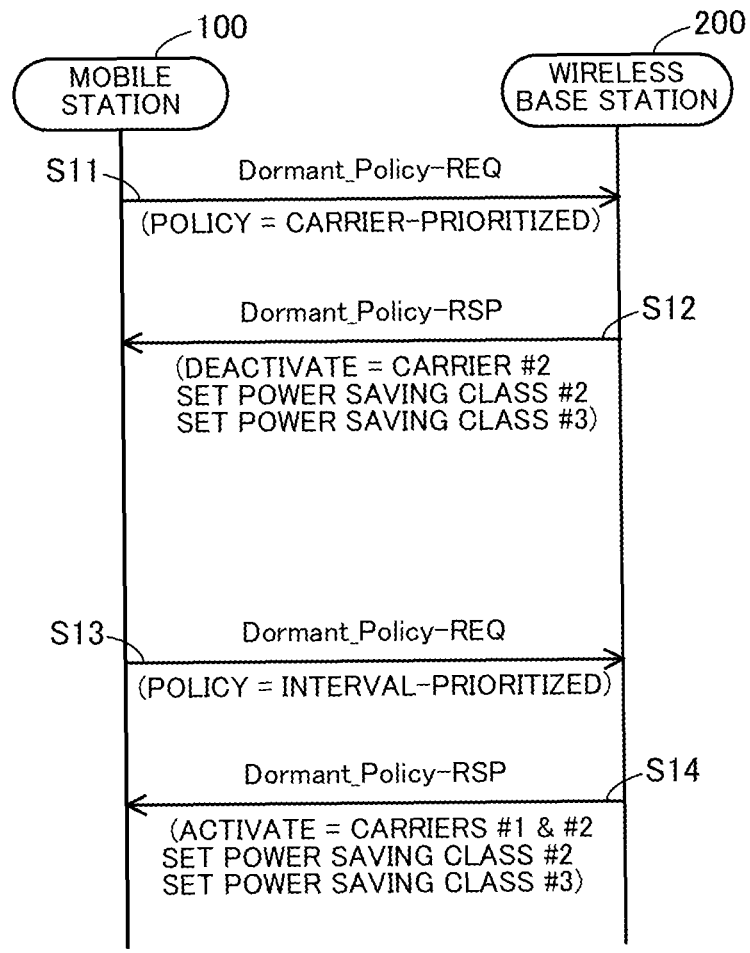
FIG. 9 is a first sequence diagram exemplifying exchange of control information.

FIG. 9 is a first sequence diagram exemplifying exchange of the control information. In the following, the process illustrated in FIG. 9 will be explained in order of step number.

Step S11: The mobile station 100 transmits a policy designation message ("Dormant_Policy-REQ") to the wireless base station 200. The policy designation message includes the information that the carrier-prioritized policy is designated.

Step S12: Following the carrier-prioritized policy, the wireless base station 200 schedules the listening intervals of the respective power saving classes #1, #2 and #3. Then, the wireless base station 200 transmits a policy response message ("Dormant_Policy-RSP") based on the scheduling result. The policy response message includes the information that the carrier #2 is to be deactivated and that the parameters of the power saving classes #2 and #3 are to be updated.

Step S13: The mobile station 100 transmits a policy designation message to the wireless base station 200. This policy designation message includes the information that the interval-prioritized policy is designated.

Step S14: Following the interval-prioritized policy, the wireless base station 200 schedules the listening intervals of the respective power saving classes #1, #2 and #3. Then, the wireless base station 200 transmits a policy response message based on the scheduling result. The policy response message includes the information that the carriers #1 and #2 are to be activated and that the parameters of the power saving classes #2 and #3 are to be updated.

Figure 10:
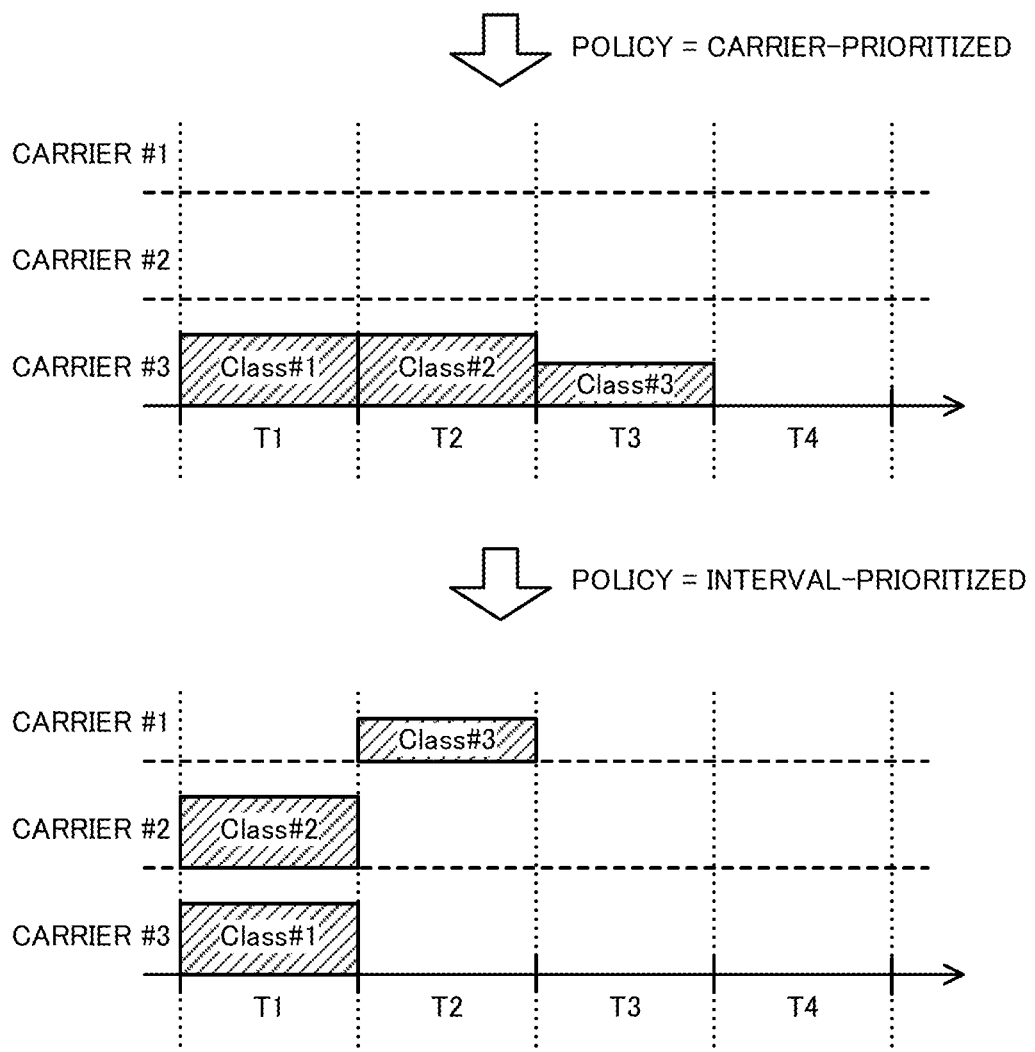
FIG. 10 is a first diagram exemplifying changes of the listening intervals.

FIG. 10 is a first diagram exemplifying changes of the listening intervals. Specifically, FIG. 10 illustrates an exemplary case where the aforementioned Steps S11 to S14 are executed while the carriers and the power saving classes #1, #2 and #3 are in their respective states illustrated in FIG. 5.

The execution of Steps S11 and S12 changes the state of the carrier #2 from the active state to the inactive state. That is, the carriers #1 and #2 are deactivated, while the carrier #3 is activated. Also, the listening intervals of the power saving classes #2 and #3 change. In this instance, the listening interval of the power saving class #2 is shifted to the timeslot T2, and the listening interval of the power saving class #3 is shifted to the timeslot T3. As a result, the timeslot T4 constitutes a sleep interval (unavailable interval) common to the power saving classes #1, #2 and #3.

Executing Steps S13 and S14 changes the states of the carriers #1 and #2 each from the inactive state to the active state. That is, all carriers #1, #2 and #3 are activated. Also, the listening intervals of the power saving classes #2 and #3 change. In this instance, the listening interval of the power saving class #2 is shifted to the timeslot T1, and the listening interval of the power saving class #3 is shifted to the timeslot T2. As a result, the timeslots T3 and T4 constitute a sleep interval (unavailable interval) common to the power saving classes #1, #2 and #3. The listening interval of the power saving class #3 failed to be shifted to the timeslot T1 presumably because the available bandwidth of the timeslot T1 of the carrier #1 was insufficient.

The mobile station 100 may designate a scheduling condition by means of the policy designation message. Such a condition can conceivably be: the designation of a minimum number of active carriers or a minimum number of inactive carriers; or the designation of a carrier that has to be activated or a carrier that has to be deactivated; or the designation of an interval that has to be excluded from the unavailable interval.

The designation of an active carrier is effective in cases where control signals for controlling the communication are transmitted via a predetermined frequency band, for example. The designation of an inactive carrier is effective in cases where there is a faulty wireless unit among the wireless units 111, 112 and 113 or where there is a difference in the power consumption among the wireless units, for example. The designation of an interval that has to be excluded from the unavailable interval is effective in cases where the control signals for controlling the communication are transmitted at predetermined timing, for example.

Figure 11:
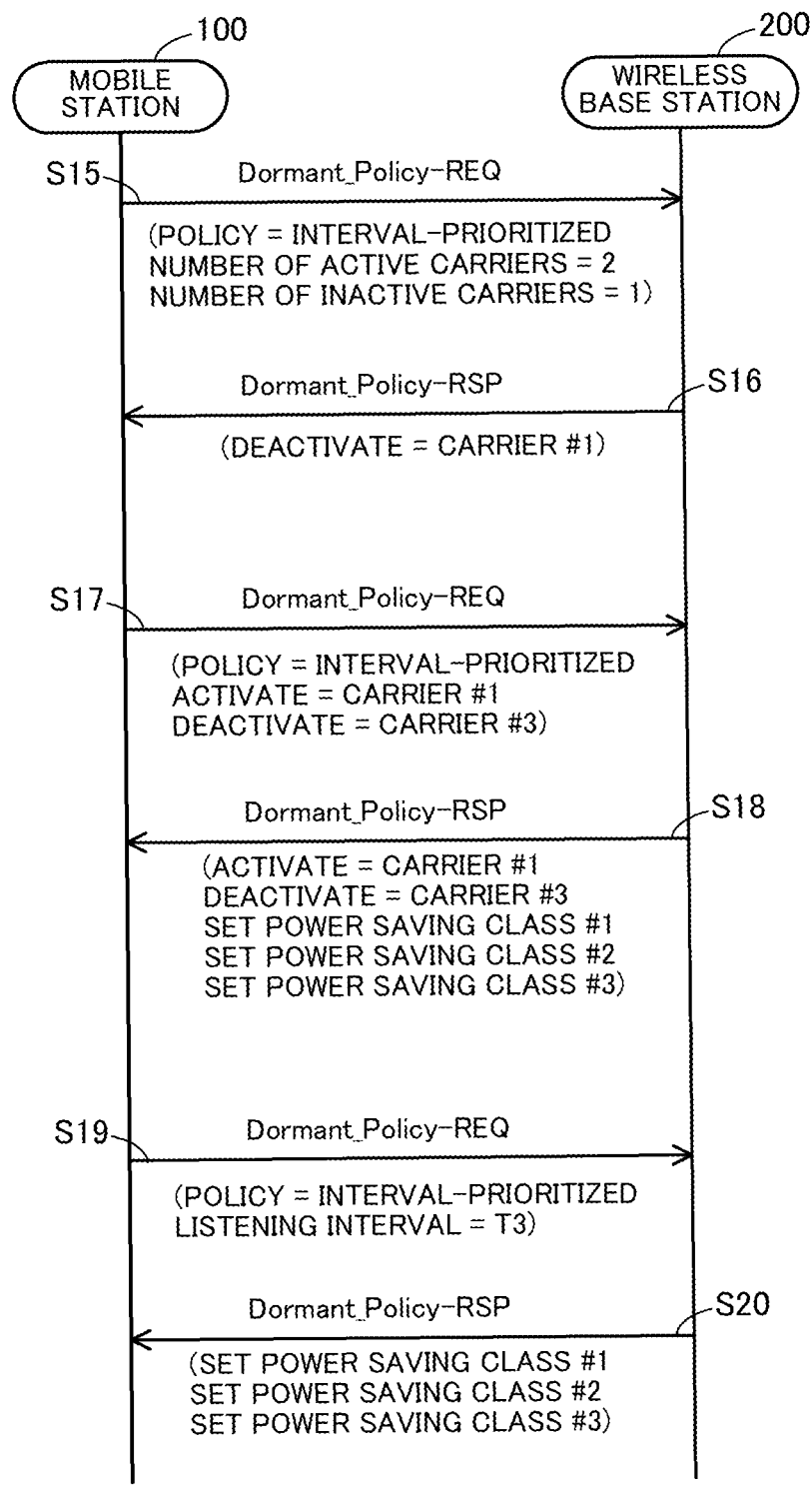
FIG. 11 is a second sequence diagram exemplifying exchange of the control information.

FIG. 11 is a second sequence diagram exemplifying exchange of the control information. This sequence is executed following the sequence of FIG. 9, for example. In the following, the process illustrated in FIG. 11 will be explained in order of step number.

Step S15: The mobile station 100 transmits a policy designation message to the wireless base station 200. This policy designation message includes the information that the interval-prioritized policy is designated, that the number of active carriers is two, and that the number of inactive carriers is one. It is also possible to designate the number of carriers as a condition, along with the carrier-prioritized policy. Further, only one of the number of active carriers and the number of inactive carriers may be designated.

Step S16: Following the interval-prioritized policy and under the condition specifying the number of carriers, the wireless base station 200 schedules the listening intervals of the respective power saving classes #1, #2 and #3. Then, the wireless base station 200 transmits a policy response message based on the scheduling result. The policy response message includes the information that the carrier #1 is to be deactivated.

Step S17: The mobile station 100 transmits a policy designation message to the wireless base station 200. The policy designation message includes information indicating the interval-prioritized policy as the designated policy, the carrier #1 as a carrier to be activated, and the carrier #3 as a carrier to be deactivated. It is also possible to designate, together with the carrier-prioritized policy, the carrier states as such condition. Further, the carrier to be activated or deactivated alone may be designated.

Step S18: Following the interval-prioritized policy and under the condition specifying the carrier states, the wireless base station 200 schedules the listening intervals of the respective power saving classes #1, #2 and #3. The wireless base station 200 then transmits a policy response message based on the scheduling result. The policy response message includes the information that the carrier #1 is to be activated, that the carrier #3 is to be deactivated, and that the parameters of the power saving classes #1, #2 and #3 are to be updated.

Step S19: The mobile station 100 transmits a policy designation message to the wireless base station 200. This policy designation message includes information indicating that the interval-prioritized policy is designated and that the timeslot T3 has to be excluded from the unavailable interval. It is also possible to designate the listening interval as a condition along with the carrier-prioritized policy.

Step S20: Following the interval-prioritized policy and under the condition specifying the listening interval, the wireless base station 200 schedules the listening intervals of the respective power saving classes #1, #2 and #3. Then, the wireless base station 200 transmits a policy response message based on the scheduling result. This policy response message includes the information that the parameters of the power saving classes #1, #2 and #3 are to be updated.

Figure 12:
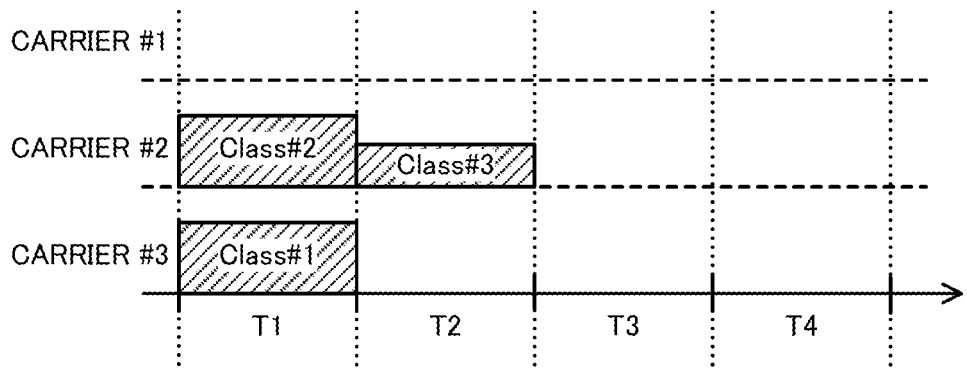
FIG. 12 is a second diagram exemplifying changes of the listening intervals.
Figure 12:
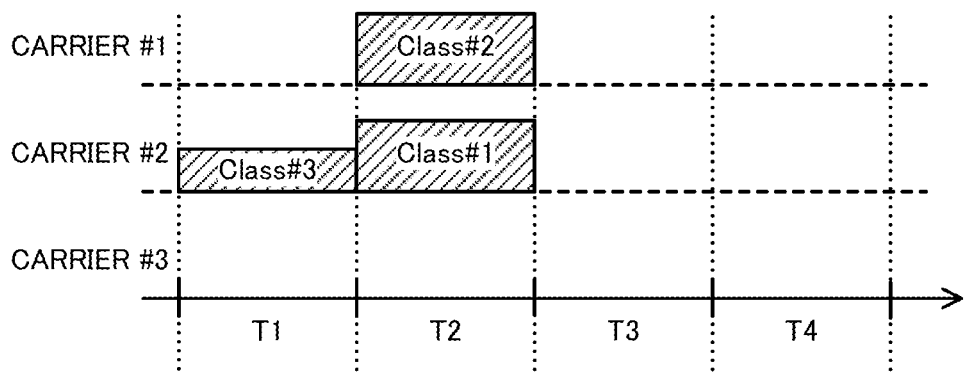
Figure 12:
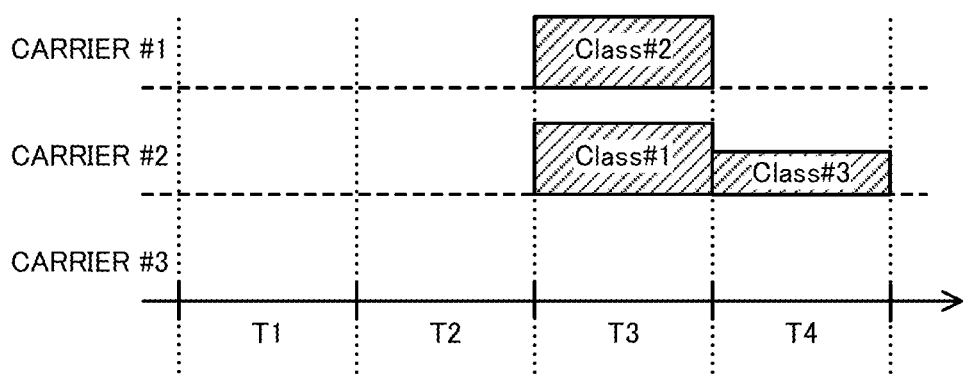

FIG. 12 is a second diagram exemplifying changes of the listening intervals. Specifically, FIG. 12 illustrates an exemplary case where the aforementioned Steps S15 to S20 are executed after the listening intervals are changed as illustrated in FIG. 10.

The execution of Steps S15 and S16 changes the state of the carrier #1 from the active state to the inactive state. That is, the carrier #1 is deactivated, while the carriers #2 and #3 are activated. The illustrated states meet the designated condition that the number of active carriers and the number of inactive carriers are two and one, respectively.

The subsequent execution of Steps S17 and S18 changes the state of the carrier #1 from the inactive state to the active state and also changes the state of the carrier #3 from the active state to the inactive state. That is, the carriers #1 and #2 are activated, while the carrier #3 is deactivated. Also, the listening intervals of the power saving classes #1, #2 and #3 change. In this instance, the listening intervals of the power saving classes #1 and #2 are shifted to the timeslot T2, and the listening interval of the power saving class #3 is shifted to the timeslot T1. As a result, the timeslots T3 and T4 constitute a sleep interval (unavailable interval) common to the power saving classes #1, #2 and #3. The illustrated states meet the designated condition that the carriers #1 and #3 are to be activated and deactivated, respectively.

Subsequently, the execution of Steps S19 and S20 changes the listening intervals of the power saving classes #1, #2 and #3. In this instance, the listening intervals of the power saving classes #1 and #2 are shifted to the timeslot T3, and the listening interval of the power saving class #3 is shifted to the timeslot T4. As a result, the timeslots T1 and T2 constitute a sleep interval (unavailable interval) common to the power saving classes #1, #2 and #3. The illustrates states meet the designated condition that the timeslot T3 is to be excluded from the unavailable interval.

In this manner, with the mobile communication system according to the first embodiment, the power saving control of the mobile station 100 can be efficiently carried out. Specifically, the mobile station 100 can be notified of the settable combination by merely designating a power saving policy, without the need to try the multiple combinations of the states of the carriers #1, #2 and #3 and the parameters of the power saving classes #1, #2 and #3 one after another. Also, by measuring the consumed powers with the multiple power saving policies designated one after another, the mobile station 100 can easily find an optimum stop control method whereby the power consumption can be minimized. Further, since various scheduling conditions can be designated, flexibility of the stop control can be ensured.

[b] Second Embodiment

A second embodiment will be now described in detail with reference to the accompanying drawings. The following description is focused on the differences between the first and second embodiments, and description of the identical elements is omitted. In a mobile communication system according to the second embodiment, a plurality of carriers are grouped so that the stop control can be executed with respect to each carrier group.

The mobile communication system of the second embodiment may have a configuration identical with that of the first embodiment illustrated in FIG. 2. Also, in the second embodiment, a mobile station and a wireless base station may be configured in the same manner as those of the first embodiment illustrated in FIGS. 3 and 4, respectively. The mobile station and the wireless base station of the second embodiment are, however, capable of communicating wirelessly with each other by using six carriers. In the following description of the second embodiment, like reference numerals are used to denote like elements also appearing in FIGS. 2 to 4.

Figure 13:
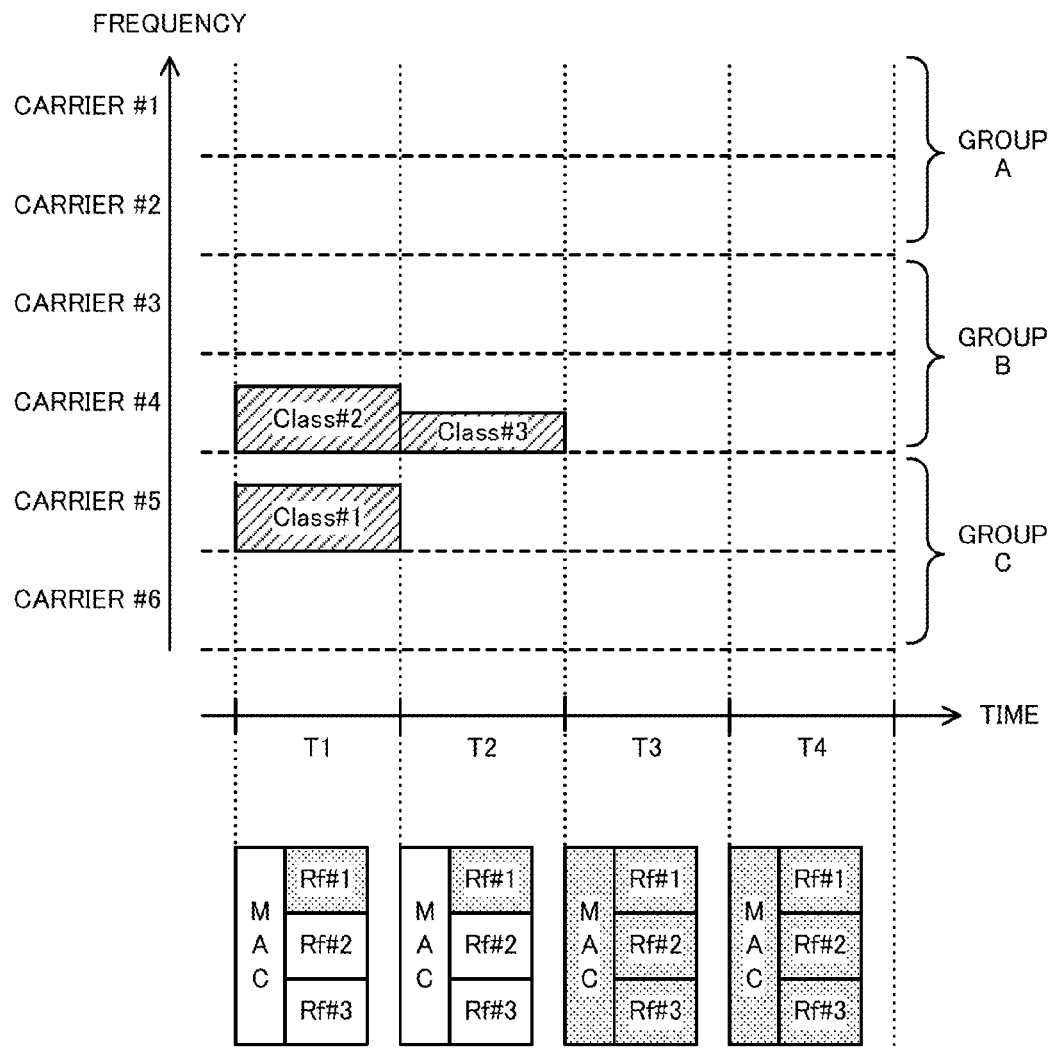
FIG. 13 illustrates an exemplary grouping of frequency bands.

FIG. 13 illustrates an exemplary grouping of frequency bands. As illustrated in FIG. 13, the mobile station 100 and the wireless base station 200 use six carriers #1 to #6. The carriers #1 and #2 are continuous frequency bands and constitute one group (group A). Similarly, the carriers #3 and #4 are continuous frequency bands and constitute one group (group B), and the carriers #5 and #6 are continuous frequency bands and constitute one group (group C).

The wireless unit 111 of the mobile station 100 and the wireless unit 211 of the wireless base station 200 perform radio signal processing of the carriers #1 and #2 (group A). The wireless unit 112 of the mobile station 100 and the wireless unit 212 of the wireless base station 200 perform radio signal processing of the carriers #3 and #4 (group B), and the wireless unit 113 of the mobile station 100 and the wireless unit 213 of the wireless base station 200 perform radio signal processing of the carriers #5 and #6 (group C).

It is assumed here that the bandwidth of the timeslot T1 of the carrier #5 is allocated to the power saving class #1, that the bandwidth of the timeslot T1 of the carrier #4 is allocated to the power saving class #2, and that the bandwidth of the timeslot T2 of the carrier #4 is allocated to the power saving class #3. In this case, the wireless unit 111 can be stopped throughout all the timeslots. On the other hand, the wireless units 112 and 113 can be stopped only during the timeslots T3 and T4 constituting the unavailable interval. Thus, where even a single carrier belonging to a certain group is activated, it is not possible to stop the wireless unit associated with that group throughout all the timeslots.

Accordingly, in the second embodiment, the mobile station 100 is allowed to designate, as a scheduling condition, a carrier group to be kept active or inactive.

Figure 14:
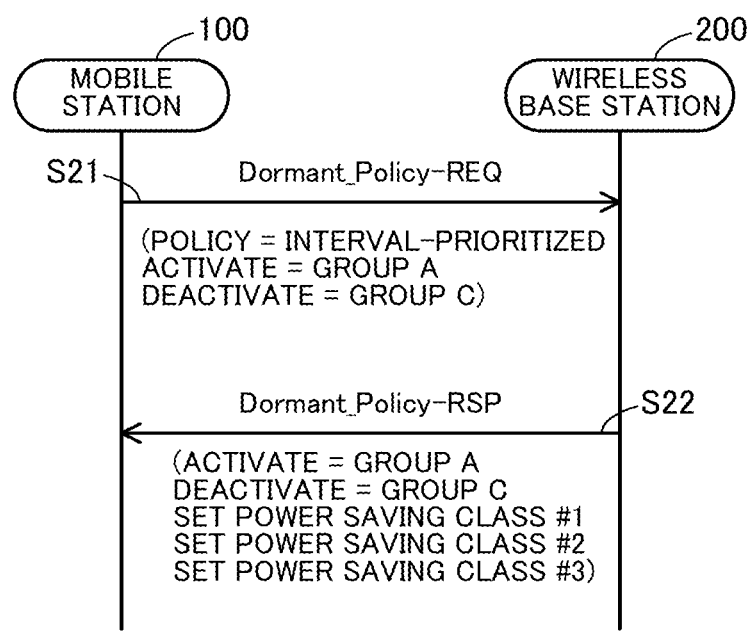
FIG. 14 is a third sequence diagram exemplifying exchange of the control information.

FIG. 14 is a third sequence diagram exemplifying exchange of control information. In the following, the process illustrated in FIG. 14 will be explained in order of step number.

Step S21: The mobile station 100 transmits a policy designation message to the wireless base station 200. The policy designation message includes information indicating the interval-prioritized policy as the designated policy, the group A as an active group, and the group C as an inactive group. It is also possible to designate, along with the carrier-prioritized policy, a certain group as a condition. Further, only one of the group to be activated and the group to be deactivated may be designated.

Step S22: Following the interval-prioritized policy and under the condition specifying groups, the wireless base station 200 schedules the respective listening intervals of the power saving classes #1, #2 and #3. Then, the wireless base station 200 transmits a policy response message based on the scheduling result. This policy response message includes the information that the carriers belonging to the group A are to be activated, that the carriers belonging to the group C are to be deactivated, and that the parameters of the power saving classes #1, #2 and #3 are to be updated.

The mobile station 100 may be configured so as to be able to designate, in the policy designation message, a minimum number of groups to be activated or a minimum number of groups to be deactivated. Also, in the policy response message, targets of activation or deactivation may be designated by using the carrier identifiers, in place of the group identifiers.

Thus, the mobile communication system of the second embodiment provides the same advantageous effects as those achieved by the first embodiment. In addition, according to the second embodiment, the stop control can be executed more efficiently in cases where one or more or all of the wireless units 111, 112 and 113 of the mobile station 100 perform radio signal processing of multiple carriers.

[c] Third Embodiment

A third embodiment will be now described in detail with reference to the accompanying drawings. The following description is focused on the differences between the first and third embodiments, and description of identical elements is omitted. In a mobile communication system according to the third embodiment, a mobile station is allowed to specify in advance whether to automatically update the listening intervals when a connection is added.

The mobile communication system of the third embodiment may have a configuration identical with that of the first embodiment illustrated in FIG. 2. Also, in the third embodiment, the mobile station and a wireless base station may be configured in the same manner as those of the first embodiment illustrated in FIGS. 3 and 4, respectively. In the following description of the third embodiment, like reference numerals are used to denote like elements also appearing in FIGS. 2 to 4.

Figure 15:
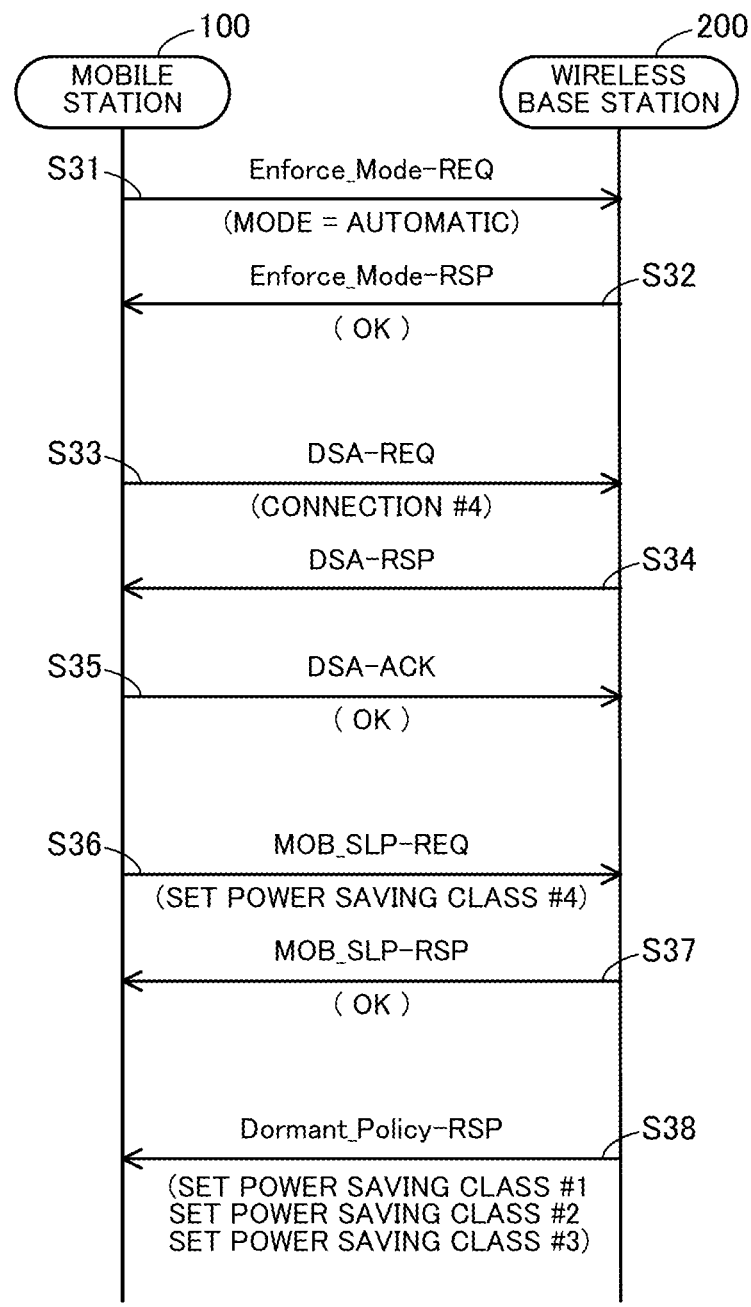
FIG. 15 is a sequence diagram exemplifying a first control procedure executed when a connection is added.

FIG. 15 is a sequence diagram exemplifying a first control procedure executed when a connection is added. This sequence illustrates the case where the listening intervals are automatically updated. In the following, the process illustrated in FIG. 15 will be explained in order of step number.

Step S31: The mobile station 100 transmits a mode designation message ("Enforce_Mode-REQ") to the wireless base station 200. The mode designation message includes the information that an automatic update mode is designated.

Step S32: The wireless base station 200 transmits a mode response message ("Enforce_Mode-RSP") to the mobile station 100. The mode response message includes the information that the automatic update mode is accepted.

Step S33: The mobile station 100 transmits a connection add request message ("DSA-REQ") to the wireless base station 200. The connection add request message includes the information that the connection #4 is to be added.

Step S34: The wireless base station 200 makes settings so that the connection #4 can be used. Then, the wireless base station 200 transmits, to the mobile station 100, a connection add response message ("DSA-RSP") indicating completion of the settings on the part of the wireless base station 200.

Step S35: The mobile station 100 makes settings so that the connection #4 can be used, and then transmits, to the wireless base station 200, a connection add completion message ("DSA-ACK") indicating completion of the settings on the part of the mobile station 100.

Step S36: The mobile station 100 transmits a sleep mode request message ("MOB_SLP-REQ") to the wireless base station 200. The sleep mode request message includes information about the definition of a parameter of the power saving class #4. Namely, the connection #4 is so defined as to belong to the power saving class #4.

Step S37: Based on the parameter of the power saving class #4 designated by the mobile station 100, the wireless base station 200 sets the power saving class #4.

Then, the wireless base station 200 transmits, to the mobile station 100, a sleep mode response message ("MOB_SLP-RSP") indicating completion of the settings.

Step S38: Since the automatic update mode has been set in Step S32, the wireless base station 200 reschedules the listening intervals following the addition of the connection #4 to the power saving class #4 in Step S37. Then, based on the scheduling result, the wireless base station 200 transmits a policy response message to the mobile station 100. The policy response message includes the information that the parameters of the power saving classes #1, #2 and #3 are to be updated.

In the above Step S38, the wireless base station 200 may schedule the listening intervals in accordance with the previously used power saving policy (e.g., interval-prioritized policy). As an alternative, the mobile station 100 may designate the power saving policy to be used, by means of the mode designation message transmitted in Step S31. Also, the listening intervals may be rescheduled when a connections is removed.

Figure 16:
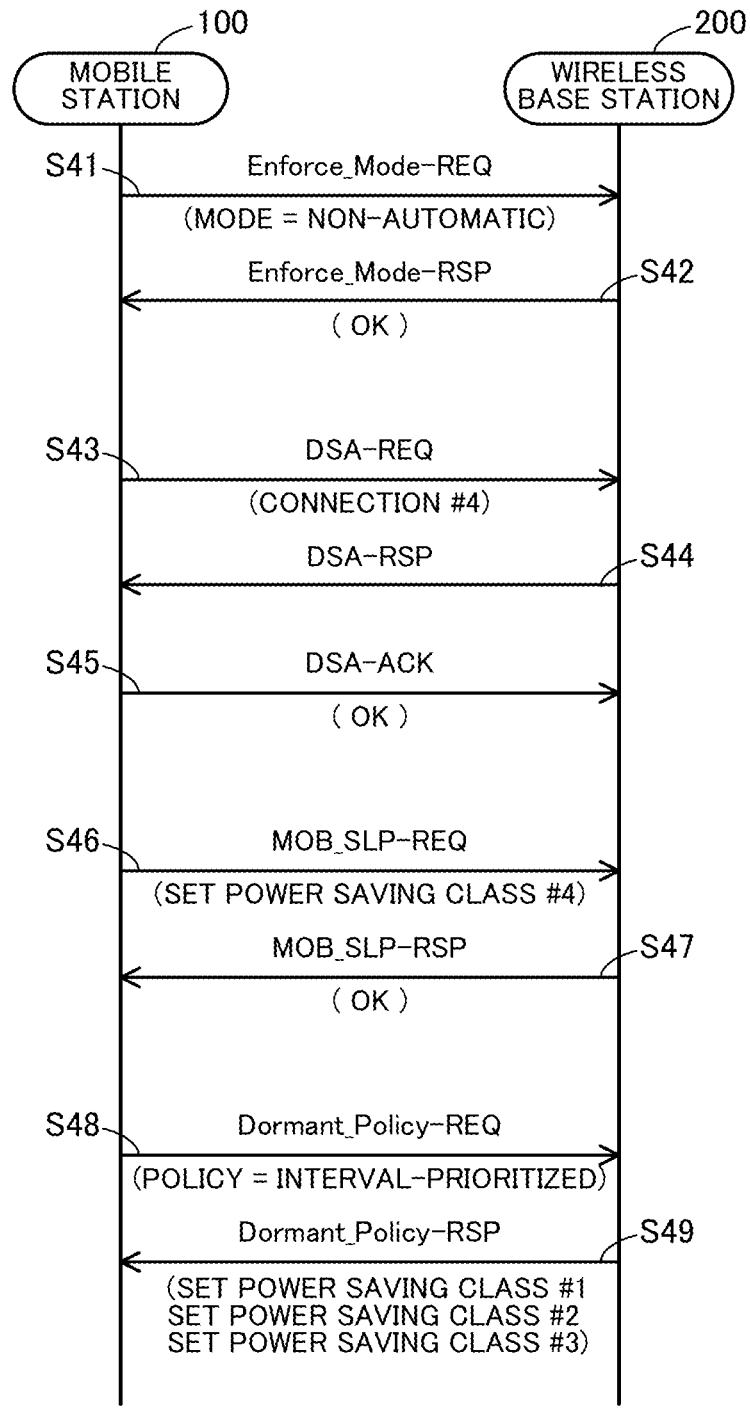
FIG. 16 is a sequence diagram exemplifying a second control procedure executed when a connection is added.

FIG. 16 is a sequence diagram exemplifying a second control procedure executed when a connection is added. This sequence illustrates the case where the listening intervals are not automatically updated. In the following, the process illustrated in FIG. 16 will be explained in order of step number.

Step S41: The mobile station 100 transmits a mode designation message to the wireless base station 200. The mode designation message includes the information that a non-automatic update mode is designated.

Step S42: The wireless base station 200 transmits a mode response message to the mobile station 100. The mode response message includes the information that the non-automatic update mode is accepted.

Steps S43 to S47 are respectively identical with Steps S33 to S37 explained above, and therefore, description of these steps is omitted.

Step S48: The mobile station 100 transmits a policy designation message to the wireless base station 200. The policy designation message includes the information that the interval-prioritized policy is designated. The mobile station 100 may defer transmitting the policy designation message until the connections #1, #2, #3 and #4 have no traffic. Since the non-automatic update mode has been designated in Step S41, the listening intervals are not automatically rescheduled.

Step S49: Following the interval-prioritized policy, the wireless base station 200 reschedules the listening intervals. Then, a policy response message based on the scheduling result is transmitted to the mobile station 100. The policy response message includes the information that the parameters of the power saving classes #1, #2 and #3 are to be updated.

The mobile communication system of the third embodiment provides the same advantageous effects as those achieved by the first embodiment. In addition, according to the third embodiment, the mobile station 100 is allowed to specify whether the power saving classes are to be automatically updated or not when a connection is added, whereby the communication quality can be further improved so as to match the status of communication.

Specifically, where the automatic update mode is set, the transmission of the mode designation message from the mobile station 100 to the wireless base station 200 can be omitted, so that the communication overhead can be reduced. When the listening intervals are changed, deviation (jitter) of signals exchanged through a traffic-carrying connection increases. Thus, it is desirable that the listening intervals be not changed while there is traffic via the connection whose jitter needs to be suppressed. By setting the non-automatic update mode, the mobile station 100 can avoid a situation where the listening intervals are changed while there is traffic via the connections.

[d] Fourth Embodiment

A fourth embodiment will be now described in detail with reference to the drawing. The following description is focused on the differences between the first and fourth embodiments, and description of the identical elements is omitted. In a mobile communication system according to the fourth embodiment, the sleep and listening intervals are changed in a stepwise fashion until predetermined conditions are fulfilled.

The mobile communication system of the fourth embodiment may have a configuration identical with that of the first embodiment illustrated in FIG. 2. Also, in the fourth embodiment, a mobile station and a wireless base station may be configured in the same manner as those of the first embodiment illustrated in FIGS. 3 and 4, respectively. In the following description of the fourth embodiment, like reference numerals are used to denote like elements also appearing in FIGS. 2 to 4.

Figure 17:
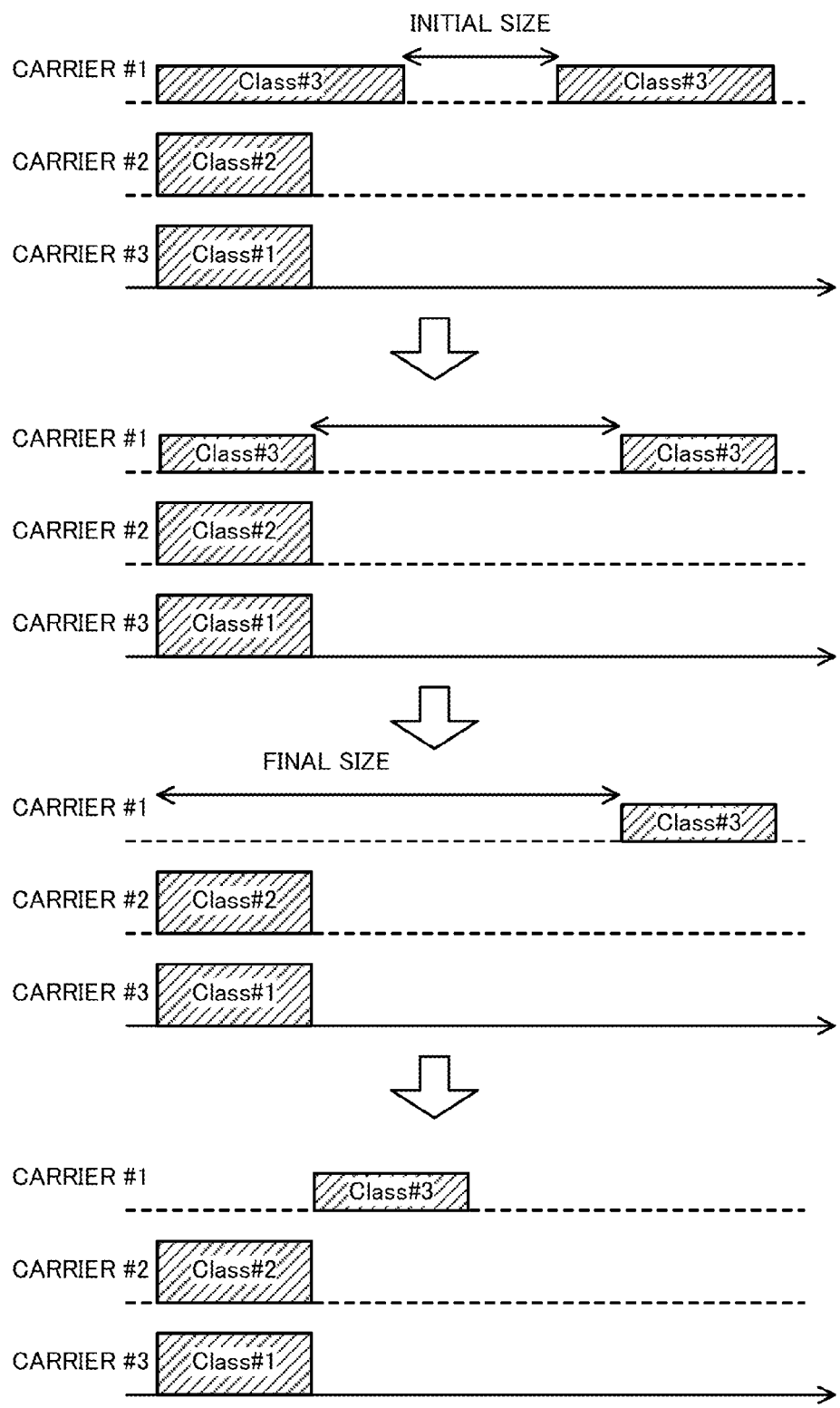
FIG. 17 is a third diagram exemplifying changes of the listening intervals.

FIG. 17 is a third diagram exemplifying change of the listening intervals. In the illustrated example, first, the length of the sleep interval of the power saving class #3 is set to an initial size designated by the mobile station 100. If a state in which there is no traffic via the connection #3 continues, the sleep interval of the power saving class #3 is prolonged in a stepwise fashion. In other words, the listening interval of the power saving class #3 is shortened in a stepwise manner. The stepwise change of the sleep interval is stopped when the length of the sleep interval reaches a maximum size designated by the mobile station 100.

Where there is a power saving class whose sleep interval changes in the aforementioned manner, the wireless base station 200 schedules the listening intervals after the sleep interval stops changing. That is, the wireless base station 200 does not start scheduling the listening intervals immediately after a policy designation message is received from the mobile station 100, but defers the scheduling and the transmission of a policy response message until the sleep interval stops changing.

If there occurs traffic via the connection #3, the length of the sleep interval is reset to the initial size. Thus, if traffic occurs intermittently via the connection #3, a situation can possibly arise wherein the sleep interval of the power saving class #3 does not stop changing even though a predetermined time has elapsed from the reception of the policy designation message. In such case, the wireless base station 200 may try the scheduling while excluding the power saving class #3. Alternatively, using an average value of the lengths of the sleep and listening intervals, the wireless base station 200 may try to schedule the listening intervals.

The mobile communication system of the fourth embodiment provides the same advantageous effects as those achieved by the first embodiment. In addition, according to the fourth embodiment, the retry of the scheduling and thus the overhead of communication control can be lessened even in cases where there is a power saving class whose sleep intervals change in a stepwise manner.

With the mobile station, the wireless base station and the wireless communication method, all described above, the sleep control can be efficiently carried out.

One example of hardware configuration of a mobile station according to the above-described embodiments will now be described. The functions of the mobile station according to the embodiments are realized by some or all of the following hardware components. The mobile station according to the embodiments includes a wireless interface (IF), processor, memory, logical circuit, input interface, and output interface. The wireless interface is an interface that performs wireless communication with a wireless base station. The processor is a device that processes data, and may be a Central Processing Unit (CPU), Digital Signal Processor (DSP), or the like. The memory is a device that stores data, and may be a Read Only Memory (ROM), Random Access Memory (RAM), or the like. The logical circuit is an electronic circuit that performs logical operations, and may be Large Scale Integration (LSI), Field-Programmable Gate Array (FPGA), Application Specific integrated Circuit (ASIC), or the like. The input interface is a device for inputs, and may be operational buttons, microphone, or the like. The output interface is a device for outputs, and may be a display, speaker, or the like.

Further, one example of hardware configuration of a wireless base station according to the above-described embodiments will now be described. The functions of the wireless base station according to the embodiments are realized by some or all of the following hardware components. The wireless base station according to the embodiments includes a wireless interface (IF), processor, memory, logical circuit, and wired interface. The wireless interface is an interface that performs wireless communication with a mobile station. The processor is a device that processes data, and may be a Central Processing Unit (CPU), Digital Signal Processor (DSP), or the like. The memory is a device that stores data, and may be a Read Only Memory (ROM), Random Access Memory (RAM), or the like. The logical circuit is an electronic circuit that performs logical operations, and may be Large Scale Integration (LSI), Field-Programmable Gate Array (FPGA), Application Specific integrated Circuit (ASIC), or the like. The wired interface is an interface that performs wired communication with another wireless base station connected to a wired network (so-called backhaul network) in a mobile telephone system.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that various changes, substitutions, and alterations could be made hereto without departing from the spirit and scope of the invention.

What is claimed is:

1. A mobile station for communicating wirelessly with a wireless base station with a plurality of connections established by using part or all of a plurality of frequency bands, comprising:
   a plurality of wireless communication interfaces associated with said plurality of frequency bands; and
   a processor configured to select, from among a plurality of scheduling policies, a policy to be used by the wireless base station, designate the selected policy by means of a sleep request, make the sleep request to the wireless base station, acquire from the wireless base station information about a result of scheduling complying with the sleep request and indicating non-sleep intervals of the individual connections and the frequency bands to be used for the respective non-sleep intervals, and perform sleep control on said plurality of wireless communication interfaces in accordance with the acquired information.

2. The mobile station according to claim 1, wherein said plurality of scheduling policies include a first policy that preferentially increases a number of the frequency bands which can be deactivated, and a second policy that preferentially prolongs an interval where sleep intervals of said plurality of connections overlap.

3. The mobile station according to claim 1, wherein the processor is further configured to measure an electric power consumption of the mobile station, and
   the processor determines a method to be employed for the sleep control, in accordance with the electric power consumptions that are measured with said plurality of scheduling policies designated.

4. The mobile station according to claim 1, wherein the processor designates, by means of the sleep request and as a condition for the scheduling, a number of the frequency bands to be activated or a number of the frequency bands to be deactivated.

5. The mobile station according to claim 1, wherein the processor designates, by means of the sleep request and as a condition for the scheduling, the frequency band to be activated or the frequency band to be deactivated.

6. The mobile station according to claim 1, wherein the processor designates, by means of the sleep request and as a condition for the scheduling, an interval to be included in the non-sleep interval.

7. The mobile station according to claim 1, wherein the processor instructs the wireless base station prior to addition of the connection whether the wireless base station has to perform rescheduling or not when the connection is added.

8. The mobile station according to claim 1, wherein the processor is further configured to process data packets received via or to be transmitted via at least one of said plurality of wireless communication interfaces, and
   the processor operates when said at least one of said plurality of wireless communication interfaces is operating, and sleeps when all of said plurality of wireless communication interfaces are sleeping.

9. The mobile station according to claim 1, wherein the information acquired from the wireless base station includes at least one of information about sleep intervals of the individual connections, information about the frequency band to be activated, and information about the frequency band to be deactivated.

10. A wireless base station for communicating wirelessly with a mobile station with a plurality of connections established by using part or all of a plurality of frequency bands, comprising:
    a receiver configured to receive a sleep request from the mobile station, the sleep request designating a policy to be used by the wireless base station which the mobile station has selected from among a plurality of scheduling policies;
    a processor configured to perform scheduling of non-sleep intervals of the individual connections and the frequency bands to be used for the respective non-sleep intervals, in compliance with the policy designated in the sleep request received by the receiver; and
    a transmitter configured to transmit information about a result of the scheduling by the processor to the mobile station.

11. The wireless base station according to claim 10, wherein, where said plurality of connections include a connection whose non-sleep interval has a length that changes until a predetermined condition is fulfilled, the processor defers the scheduling until the non-sleep interval stops changing.

12. A wireless communication method allowing a mobile station and a wireless base station to communicate wirelessly with each other with a plurality of connections established by using part or all of a plurality of frequency bands, comprising:
    causing the mobile station to select, from among a plurality of scheduling policies, a policy to be used by the wireless base station, and designate the selected policy by means of a sleep request,
    causing the mobile station to transmit the sleep request to the wireless base station;
    causing the wireless base station to perform scheduling of non-sleep intervals of the individual connections and the frequency bands to be used for the respective non-sleep intervals, in compliance with the policy designated in the sleep request, and to transmit information about a result of the scheduling to the mobile station; and
    causing the mobile station to perform sleep control on a plurality of wireless communication interfaces thereof associated with said plurality of frequency bands, in accordance with the information transmitted from the wireless base station.

* * * * *